(12) United States Patent
Kawano et al.

(10) Patent No.: US 12,055,799 B2
(45) Date of Patent: Aug. 6, 2024

(54) INFORMATION PROCESSING DEVICE, INFORMATION PROCESSING METHOD AND MOBILE OBJECT

(71) Applicant: SONY CORPORATION, Tokyo (JP)

(72) Inventors: Jiro Kawano, Tokyo (JP); Sai Karasawa, Tokyo (JP); Aisa Matsunaga, Tokyo (JP)

(73) Assignee: SONY CORPORATION, Tokyo (JP)

( * ) Notice: Subject to any disclaimer, the term of this patent is extended or adjusted under 35 U.S.C. 154(b) by 772 days.

(21) Appl. No.: 17/250,580

(22) PCT Filed: Jul. 29, 2019

(86) PCT No.: PCT/JP2019/029660
§ 371 (c)(1),
(2) Date: Feb. 4, 2021

(87) PCT Pub. No.: WO2020/036057
PCT Pub. Date: Feb. 20, 2020

(65) Prior Publication Data
US 2021/0318560 A1 Oct. 14, 2021

(30) Foreign Application Priority Data

Aug. 16, 2018 (JP) ................. 2018-153243

(51) Int. Cl.
*G02F 1/01* (2006.01)
*B60J 3/04* (2006.01)

(52) U.S. Cl.
CPC .............. *G02F 1/0121* (2013.01); *B60J 3/04* (2013.01)

(58) Field of Classification Search
CPC ........... G02F 1/0121; G02F 1/13; G02F 1/133
See application file for complete search history.

(56) References Cited

U.S. PATENT DOCUMENTS

2018/0046058 A1* 2/2018 Kaphengst ................. B60J 3/04

FOREIGN PATENT DOCUMENTS

| CN | 107719082 A | 2/2018 |
|---|---|---|
| DE | 102017118403 A1 | 2/2018 |
| JP | 6433303 A | 2/1989 |
| JP | 04-63718 A | 2/1992 |
| JP | 05-203906 A | 8/1993 |
| JP | 2005-035384 A | 2/2005 |

OTHER PUBLICATIONS

International Search Report and Written Opinion of PCT Application No. PCT/JP2019/029660, issued on Sep. 17, 2019, 10 pages of ISRWO.

* cited by examiner

*Primary Examiner* — Joseph P Martinez
(74) *Attorney, Agent, or Firm* — CHIP LAW GROUP

(57) ABSTRACT

An information processing device according to an aspect of the present technology includes an acquisition section and a calculation section. The acquisition section acquires information on a target region inside a glass window of a mobile object, and information on an external environment outside the mobile object, the information on the external environment including information on outside light incident on the glass window. The calculation section calculates a light shielding region for shielding the target region from light by blocking the outside light on the glass window, on the basis of the acquired information on the target region and the acquired information on the external environment.

19 Claims, 17 Drawing Sheets

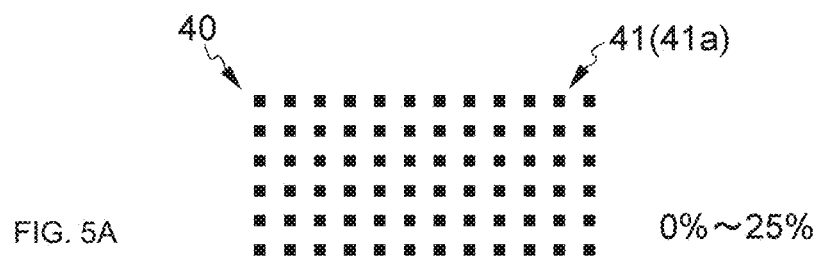
FIG. 5A  0%~25%
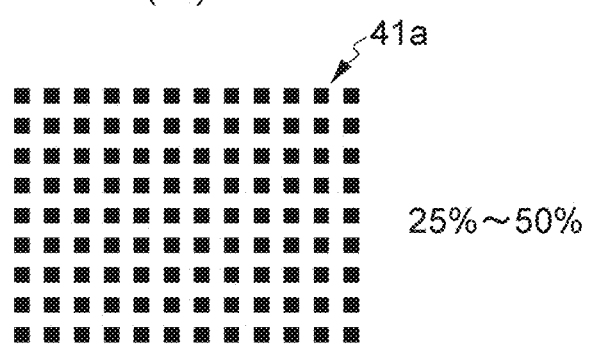
FIG. 5B  25%~50%
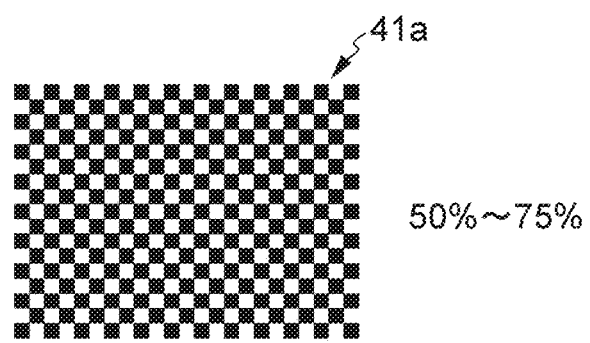
FIG. 5C  50%~75%
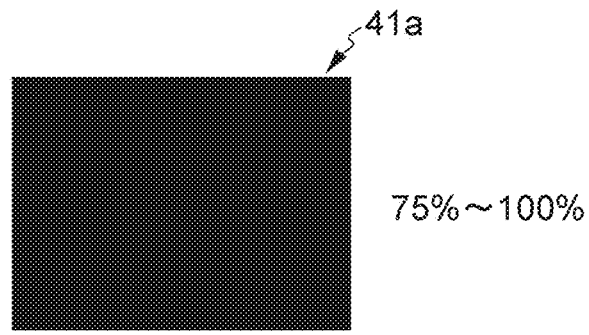
FIG. 5D  75%~100%

0%~25%

25%~50%

50%~75%

75%~100%

100%~75%

50%~75%

25%~50%

0%~25%

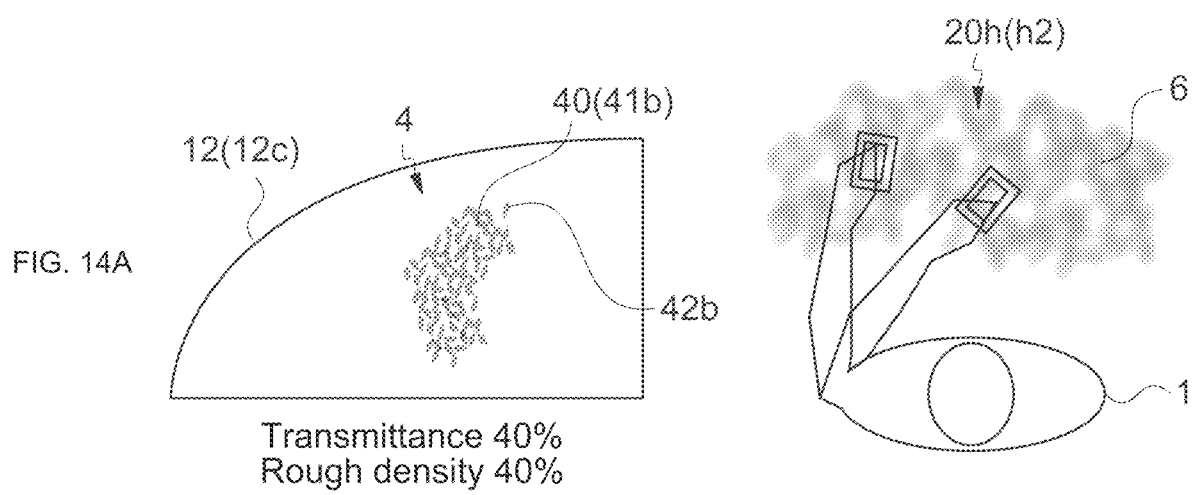
FIG. 14A  Transmittance 40% Rough density 40%
FIG. 14B  Transmittance 20% Rough density 80%
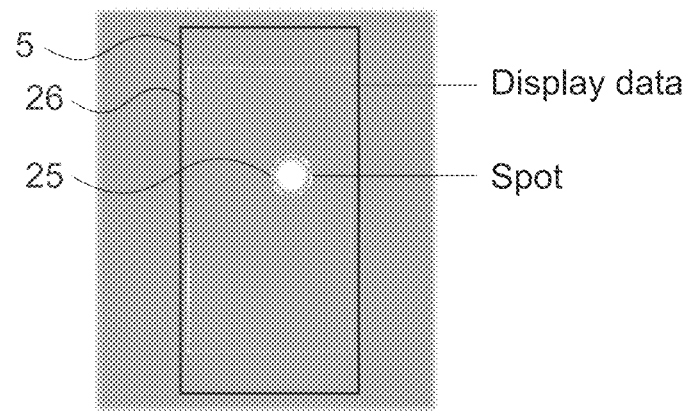
FIG. 15

INFORMATION PROCESSING DEVICE, INFORMATION PROCESSING METHOD AND MOBILE OBJECT

CROSS REFERENCE TO RELATED APPLICATIONS

This application is a U.S. National Phase of International Patent Application No. PCT/JP2019/029660 filed on Jul. 29, 2019, which claims priority benefit of Japanese Patent Application No. JP 2018-153243 filed in the Japan Patent Office on Aug. 16, 2018. Each of the above-referenced applications is hereby incorporated herein by reference in its entirety.

TECHNICAL FIELD

The present technology relates to an information processing device, an information processing method, a program that are applicable to a light shielding device or the like installed in the mobile object, and the and a mobile object.

BACKGROUND ART

Patent Literature 1 discloses an anti-dazzle system that shields eyes of an occupant from sunlight passed through a front windshield of a vehicle. In the anti-dazzle system, an optical element for reflecting incident light back to its incident direction is mounted near the eyes of the occupant by using a band or the like. In addition, the front windshield of the vehicle is provided with a light shielding member and a light sensor. The light shielding member changes transmittance of respective blocks in a matrix, and the light sensor detects reflected light from the optical element. The anti-dazzle system is capable of blocking glare incident on the eyes of the occupant by controlling transmittance of respective light shielding members on the basis of output from the light sensor (see paragraphs [0012], [0017], [0020], [0023], FIG. 1, FIG. 3, and the like in Patent Literature 1).

CITATION LIST

Patent Literature

Patent Literature 1: JP H5-203906A

DISCLOSURE OF INVENTION

Technical Problem

As described above, technologies of blocking outside light such as sunlight incident on a mobile object have been developed. When blocking the outside light on the mobile object, for example, sometimes a field of view of the occupant may be shielded unnaturally. Therefore, there is a need for a technology capable of naturally blocking the outside light.

In view of the circumstances as described above, a purpose of the present technology is to provide an information processing device, an information processing method, a program, and a mobile object that are capable of naturally blocking the outside light.

Solution to Problem

To accomplish the above-described purpose, an information processing device according to an aspect of the present technology includes an acquisition section and a calculation section.

The acquisition section acquires information on a target region inside a glass window of a mobile object, and information on an external environment outside the mobile object, the information on the external environment including information on outside light incident on the glass window.

The calculation section calculates a light shielding region for shielding the target region from light by blocking the outside light on the glass window, on the basis of the acquired information on the target region and the acquired information on the external environment.

The information processing device calculates the light shielding region for shielding the target region inside the glass window from light by blocking the outside light on the glass window of the mobile object. The information on the target region and the information on the external environment including the information on the outside light are used for calculating the light shielding region. For example, this makes it possible to calculate the light shielding region tailored to the external environment outside the mobile object and naturally block the outside light.

The information on the outside light may include information on an incident direction of the outside light relative to the mobile object. In this case, the information on the target region may include information on a position of the target region. In addition, the calculation section may calculate a position of the light shielding region on the glass window on the basis of the incident direction of the outside light and the position of the target region.

This makes it possible to calculate a position of the light shielding region high accuracy, and it is possible to accurately shield the target region.

The information on the target region may include information on at least one of shape or size of the target region. In this case, the calculation section may calculate at least one of shape or size of the light shielding region on the basis of at least one of the incident direction of the outside light and the shape or size of the target region.

This makes it possible to calculate shape or size of the light shielding region with high accuracy. As a result, it is possible to certainly shield the target region, for example.

The information on the target region may include information on brightness in the target region. In this case, the calculation section may calculate transmittance of the light shielding region to the outside light on the basis of the brightness in the target region.

This makes it possible to accurately calculate transmittance necessary for blocking the outside light. As a result, it is possible to appropriately block the outside light.

The target region may be set around an occupant who is in a space inside the glass window of the mobile object.

This makes it possible to calculate the light shielding region for blocking light around the occupant. As a result, it is possible to naturally block the outside light or the like, which dazzles the occupant, for example.

The target region may be set to at least one of an eye of the occupant, a hand of the occupant, or a terminal device used by the occupant.

This makes it possible to accurately block outside light that directly enters the eyes of the occupant, outside light that is reflected by the terminal device or the like and enters the eyes of the occupant, and the like, for example.

The target region may be fixedly set near the occupant.

By fixing the target region, it is possible to easily calculate the light shielding region, for example. As a result, it is possible to easily block outside light or the like that enters the eyes of the occupant directly/indirectly.

The information on the external environment may include scenery information regarding scenery around the mobile object. In this case, the calculation section may set a light shielding pattern of the light shielding region on the basis of the scenery information.

This makes it possible to naturally block the outside light by using the light shielding pattern tailored to the external environment. As a result, it is possible to sufficiently reduce a feeling of strangeness when viewing surrounding scenery.

The calculation section may select a light shielding pattern with a tag related to the scenery information from among a plurality of the light shielding patterns with tags related to scenery.

This makes it possible to easily select the light shielding pattern tailored to the external environment.

The light shielding patterns may include a relevant pattern which is related to the scenery.

As a result, it is possible to view the surrounding scenery without a feeling of strangeness.

The light shielding patterns may include a group pattern formed of a plurality of the relevant patterns.

By using the group pattern, it is possible to easily achieve various sizes and shapes of the light shielding regions. As a result, it is possible to accurately block the outside light while reducing a feeling of strangeness.

The light shielding patterns may include at least one of a coarse/fine pattern whose transmittance changes discontinuously in the light shielding region, or a gradation pattern whose transmittance changes continuously in the light shielding region.

This makes it possible to finely adjust a state of a shadow cast by blocking the outside light. As a result, it is possible to appropriately block the outside light depending on a type of the target region or the like, for example.

The coarse/fine pattern may include light shielding blocks that are disposed at intervals in the light shielding region and block the outside light.

This makes it possible to finely adjust rough density of the shadow cast by blocking the outside light.

The information on the target region may include information on contrast of the target region. In this case, the calculation section may set a rate of the light shielding blocks in the light shielding region on the basis of the contrast of the target region.

This makes it possible to accurately calculate transmittance, rough density, or the like necessary for blocking the outside light. As a result, it is possible to appropriately block the outside light.

The calculation section may set a rate of the light shielding blocks in the light shielding region on the basis of size of an irradiated spot in the target region, the irradiated spot being irradiated with the outside light that has passed through the intervals.

This makes it possible to appropriately control an amount of light leaked from the coarse/fine pattern. For example, it is possible to naturally block the outside light without disturbing work or the like performed by the occupant.

The calculation section may set the light shielding pattern depending on shape of the light shielding region.

This makes it possible to avoid a situation of using a deformed light shielding pattern or the like, for example. Therefore, it is possible to naturally block the outside light.

The calculation section may calculate the light shielding region in such a manner that the light shielding region includes predetermined display information.

This makes it possible to display various kinds of information by using the light shielding region and naturally block the outside light.

An information processing method according to an aspect of the present technology is performed by a computer system. The method includes acquisition of information on a target region inside a glass window of a mobile object, and information on an external environment outside the mobile object, the information on the external environment including information on outside light incident on the glass window.

A light shielding region for shielding the target region from light by blocking the outside light on the glass window is calculated on the basis of the acquired information on the target region and the acquired information on the external environment.

A program according to an aspect of the present technology causes a computer system to perform:

a step of acquiring information on a target region inside a glass window of a mobile object, and information on an external environment outside the mobile object, the information on the external environment including information on outside light incident on the glass window; and a step of calculating a light shielding region for shielding the target region from light by blocking the outside light on the glass window, on the basis of the acquired information on the target region and the acquired information on the external environment.

A mobile object according to an aspect of the present technology includes a glass window, an acquisition section, a calculation section, and a light shielding unit.

The glass window divides at least a portion of an interior space from an outside of the mobile object.

The acquisition section acquires information on a target region in the interior space, and information on an external environment outside the mobile object, the information on the external environment including information on outside light incident on the glass window.

The calculation section calculates a light shielding region for shielding the target region from light by blocking the outside light on the glass window, on the basis of the acquired information on the target region and the acquired information on the external environment.

The light shielding unit is disposed on the glass window to generate the calculated light shielding region.

Advantageous Effects of Invention

As described above, according to the present technology, it is possible to naturally block the outside light. Note that the effects described here are not necessarily limited, and any effect that is desired to be described in the present disclosure may be exhibited.

BRIEF DESCRIPTION OF DRAWINGS

FIGS. 5A, 5B, 5C, and 5D are examples of a coarse/fine pattern using a geometric form.

FIGS. 14A and 14B are schematic diagrams for describing examples of shielding a hand of an occupant from light.

FIG. 15 is a schematic diagram illustrating an example of an irradiated spot on a mobile terminal.

MODE(S) FOR CARRYING OUT THE INVENTION

Hereinafter, embodiments of the present technology will be described with reference to drawings.

Figure 1:
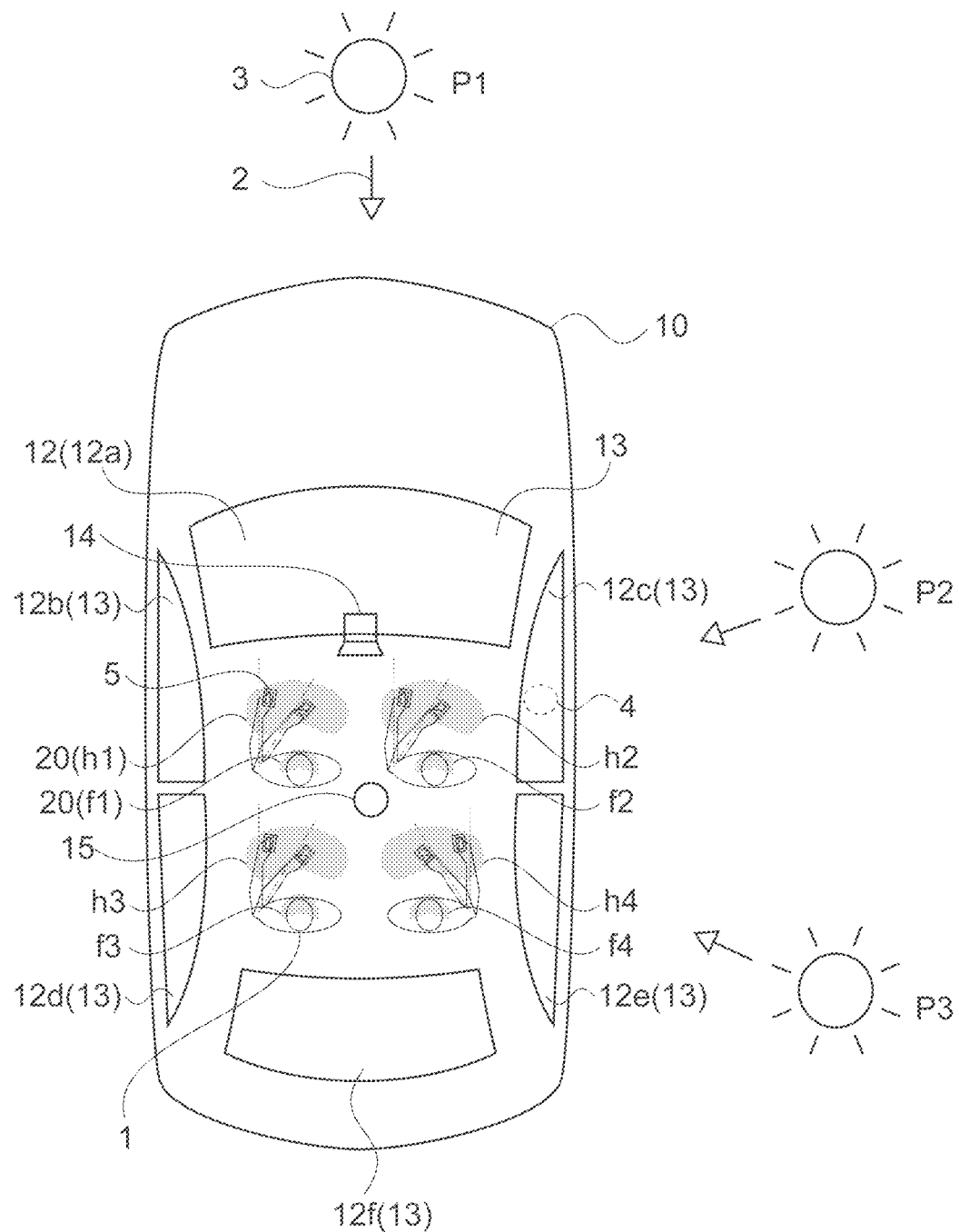
FIG. 1 is a schematic diagram illustrating appearance of a vehicle provided with a light shielding control system according to an embodiment of the present technology.
Figure 2:
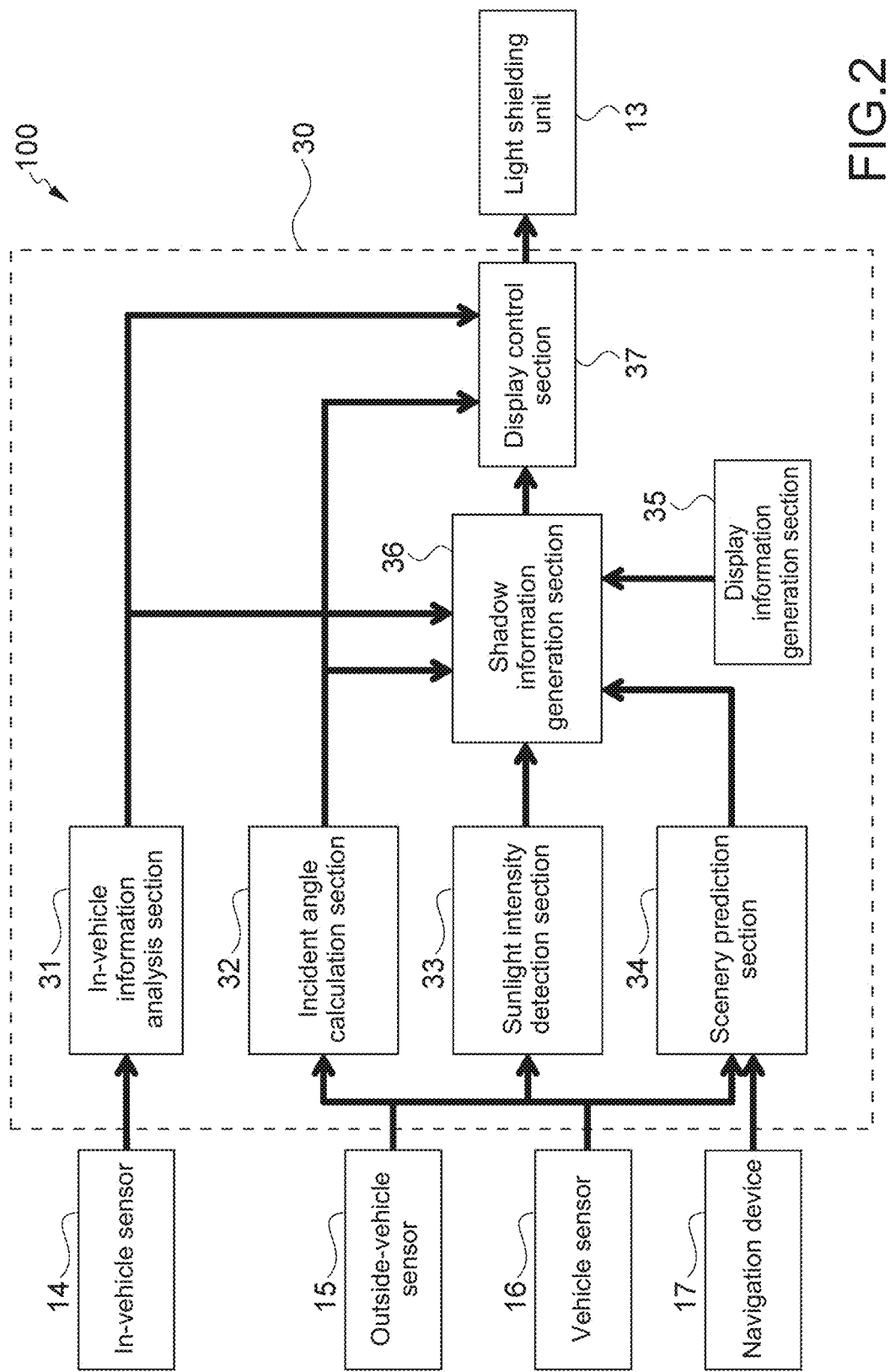
FIG. 2 is a block diagram illustrating a configuration example of a light shielding control system.

FIG. 1 is a schematic diagram illustrating appearance of a vehicle provided with a light shielding control system according to an embodiment of the present technology. FIG. 2 is a block diagram illustrating a configuration example of a light shielding control system 100. A vehicle 10 is a car that moves while accommodating an occupant 1. The vehicle 10 has an autonomous driving function capable of automatically driving to a destination, for example. In the present embodiment, the vehicle 10 is an example of a mobile object.

FIG. 1 schematically illustrates a situation of an in-vehicle space 11 obtained when the vehicle 10 is seen from above. A top side of FIG. 1 corresponds to a front side of the vehicle 10, and a bottom side of FIG. 1 corresponds to a rear side of the vehicle 10. In addition, the vehicle 10 is a four-seat car provided with two front seats (front left seat and front right seat) and two rear seats (rear left seat and rear right seat). Four occupants set on the four respective seats. Of course, the present technology is not limited thereto. The present technology is applicable to any vehicle 10 such as a two-seater coupe, a six-seater van, a bus, or a truck.

The vehicle 10 includes a plurality of glass windows 12, a light shielding unit 13, an in-vehicle sensor 14, and an outside-vehicle sensor 15.

The plurality of glass windows 12 includes a front windshield 12a, four side glass windows 12b to 12e, and a rear glass window 12f. The front glass window 12a is disposed in front of the occupant 1. The four side glass windows 12 include side glass windows 12b and 12c that are disposed on a left side and a right side with the two front seats interposed therebetween, and side glass windows 12d and 12e that are disposed on the left side and the right side with the two rear seats interposed therebetween. The rear glass window 12f is disposed in back of the occupant 1.

As described above, the in-vehicle space 11 accommodating the occupant 1 is a space surrounded by the glass windows 12. In other words, the in-vehicle space 11 is the space inside the glass windows 12 of the vehicle 10. Accordingly, the occupant 1 who is in the in-vehicle space 11 views scenery outside the vehicle 10 from front to back and from left to right through the respective glass windows 12. Note that, the in-vehicle space 11 is a vehicle interior space of the vehicle 10. In other words, it can be said that the in-vehicle space 11 is an interior space. As described above, the vehicle 10 includes the glass windows that divide at least a portion of the interior space from an outside of the vehicle 10.

The light shielding unit 13 has a light shielding function of blocking outside light incident toward the in-vehicle space 11 through the respective glass windows 12. For example, the light shielding unit 13 is provided on each of the front windshield 12a, the side glass windows 12b to 12e, and the rear glass window 12f described above.

Note that, according to the present disclosure, the outside light is light incident from an outside of the vehicle (in-vehicle space 11). Typically, the outside light is sunlight 2 (direct sunlight). Hereinafter, the description will be given on the assumption that the outside light is the sunlight 2. In FIG. 1, outline arrows schematically indicate sunlight 2 incident on the vehicle 10 in the case where the sun 3 is at three positions P1 to P3 around the vehicle 10.

The light shielding unit 13 includes a plurality of light shielding elements (not illustrated) disposed along the glass windows 12. The plurality of light shielding elements is disposed on a surface of the glass window 12 or inside the glass window 12 in a matrix in a vertical direction and a lateral direction that are perpendicular to each other along a surface direction of the glass window 12.

Each of the light shielding elements is configured to be capable of controlling transmittance of light. For example, the light shielding element is configured using dichroic display material (particle dispersion material such as liquid crystal), which changes its transmittance (color) when voltage is applied. For example, a liquid crystal shutter with transparency or the like is used as the light shielding element. The liquid crystal shutter is obtained by wiring transparent electrodes such as indium tin oxide (ITO) or graphene.

For example, by appropriately controlling voltage to be applied to the plurality of light shielding elements, it is possible to partially control amounts of light passing through the glass windows 12 (amounts of light transmission). Therefore, by installing the light shielding unit 13, it is possible to generate a transmittance-controlled region of any shape and size, at a desired position on the glass window 12 of the vehicle 10.

The sunlight 2 (direct sunlight) incident on the transmittance-controlled region is blocked at a rate depending on transmittance set for the irradiated region. Therefore, the transmittance-controlled region becomes a light shielding region 4 for blocking the sunlight 2. In other words, it can be said that the light shielding region 4 is a region for controlling transmittance to reduce intensity (amount of transmittance) of the sunlight 2 penetrating into the in-vehicle space 11. In FIG. 1, a dotted line schematically indicates the light shielding region 4 on the side glass window 12d as an example.

Figure 11:
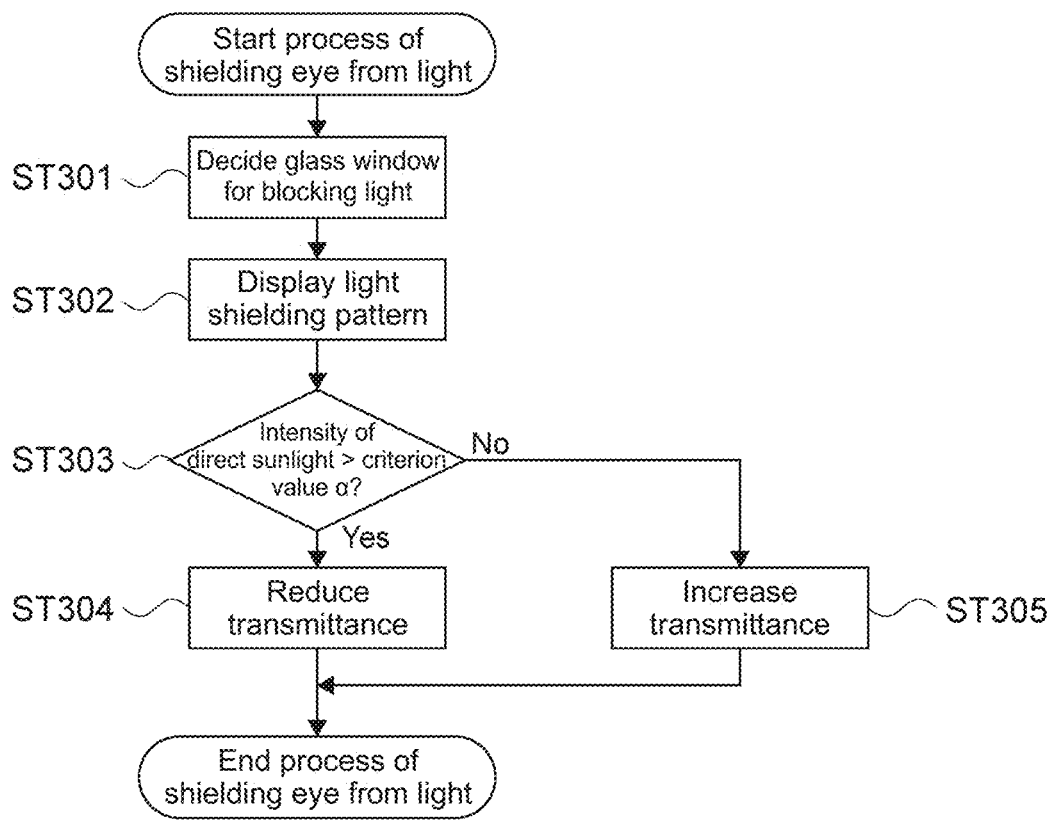
FIG. 11 is a flowchart illustrating an example of a process of shielding eyes from light.

The in-vehicle sensor 14 is a sensor for detecting a state of the in-vehicle space 11. Typically, an in-vehicle camera for capturing an image of the in-vehicle space 11 is used as the in-vehicle sensor 14. FIG. 11 schematically illustrates the in-vehicle camera (in-vehicle sensor 14) for capturing an image of the in-vehicle space 11 from a front side of the in-vehicle space 11.

The in-vehicle camera is disposed in such a manner that the in-vehicle camera is capable of capturing an image of a target region 20 in the in-vehicle space 11. The number of in-vehicle cameras is not limited. For example, a plurality of the in-vehicle cameras may be installed in such a manner that the plurality of the in-vehicle cameras can capture images of the target region 20, for example. Details of the target region 20 will be described later.

As the in-vehicle camera, it is possible to use an RGB camera including an image sensor such as a charge coupled device (CCD) or a complementary metal oxide semiconductor (CMOS), for example. The present technology is not limited thereto. It is also possible to appropriately use an infrared camera for detecting infrared light, a time-of-flight (ToF) camera capable of measuring a distance to a subject, a stereo camera, or the like.

Note that, a sensor other than the in-vehicle camera may be installed as the in-vehicle sensor 14. For example, an illuminance sensor, a temperature sensor, or the like may be installed. The illuminance sensor measures intensity of the sunlight 2 incident on the in-vehicle space 11. The temperature sensor detects temperatures of respective parts or the like. In addition, for example, an angle sensor or the like may be installed. The angle sensor detects a reclining angle of a seat on which the occupant 1 sits or the like. In addition, the type of the in-vehicle sensor 14 is not limited.

The outside-vehicle sensor 15 is a sensor for detecting a state of an outside of the vehicle 10. For example, a sun sensor may be used as the outside-vehicle sensor 15. The sun sensor detects an incident direction of the sunlight 2 and intensity (luminance) of the sunlight 2, for example. In addition, an outside-vehicle camera may be used as the outside-vehicle sensor 15. The outside-vehicle camera captures an image of a situation around the vehicle 10, for example. FIG. 1 schematically illustrates the outside-vehicle sensor 15 (such as the sun sensor or the outside-vehicle camera) installed above the in-vehicle space (near a center of the vehicle 10).

Note that, a distance sensor such as a ToF camera, a stereo camera, a laser imaging detection and ranging (LiDAR) sensor, a rangefinder camera, a millimeter-wave radar, or an infrared laser may be installed as the outside-vehicle sensor 15. In addition, an environment sensor such as a raindrop sensor, a fog sensor, a sunshine sensor, or a snow sensor may be installed.

In addition, the type and the like of the outside-vehicle sensor 15 is not limited. Any sensor capable of detecting a situation outside the vehicle may be installed.

As illustrated in FIG. 2, the vehicle 10 further includes a vehicle sensor 16, a navigation device 17, and a controller 30. In the present embodiment, the light shielding control system 100 is configured using the in-vehicle sensor 14, the outside-vehicle sensor 15, the light shielding unit 13, the vehicle sensor 16, the navigation device 17, and the controller 30.

The vehicle sensor 16 is a sensor for detecting a state of the vehicle 10. For example, a sensor for detecting speed, acceleration, and the like of the vehicle 10 is used as the vehicle sensor 16. Specifically, a speed sensor, an acceleration sensor, a sensor or the like for detecting an amount of operation of an accelerator pedal, an amount of operation of a brake pedal, an steering angle of a steering wheel, the number of revolutions of an engine, the number of revolutions of a motor, rotational speeds of wheels, or the like is used as the vehicle sensor 16.

In addition, a sensor for detecting a position/posture of the vehicle as a state of the vehicle 10 is installed as the vehicle sensor 16. For example, it is possible to use a Global Positioning System (GPS) sensor for receiving a signal from an artificial satellite and detecting a current position of the vehicle 10, a gyro sensor for detecting a posture of the vehicle 10, an inertial measurement unit (IMU), or the like. In addition, it is possible to use any sensor for detecting a state of the vehicle 10 such as a geomagnetic sensor for detecting a direction of the vehicle 10 or the like.

The navigation device 17 has a navigation function of detecting a current position of the vehicle 10 and calculating a planned route to a destination of the vehicle 10 or the like. The navigation device 17 detects the current position of the vehicle 10 by using the GPS sensor. Typically, information on the current position of the vehicle 10 is information on latitude and longitude of the position of the vehicle 10.

In addition, the navigation device 17 calculates the planned route to the destination of the vehicle 10 or the like on the basis of predetermined map data. The map data includes geographic data such as information on roads on which the vehicle 10 travels, information regarding various kinds of facilities, buildings, and the like, and information regarding a driving environment (for example information indicating that the vehicle 10 is traveling in a mountain forest district, an oceanfront district, or the like).

Accordingly, the navigation device 17 is capable of providing information on an external environment around the vehicle 10 in the current position of the vehicle 10. The information on the current position, the planned route, the driving environment, and the like of the vehicle 10, which have been calculated by the navigation device 17, is displayed on a predetermined display or the like, and provided to the occupant, for example. In addition, such information is provided to a vehicle control system or the like for controlling autonomous driving of the vehicle 10 or the like.

The controller 30 functions as the information processing device according to the present embodiment, and controls the light shielding units 13 attached to the glass windows 12 of the vehicle 10. The controller 30 include a hardware configuration necessary for a computer such as a central processing unit (CPU) or memory (random access memory (RAM) or read only memory (ROM)), for example. An information processing method according to the present technology is executed when the CPU loads a program (application) into the RAM and executes the program. The program according to the present technology is stored in the ROM.

The program is installed into the controller 30 via a predetermined storage medium or a network such as the Internet. Note that, the method of installing the program is not limited.

For example, it is possible to use a programmable logic device (PLD) such as a field programmable gate array (FPGA), or another device such as an application specific integrated circuit (ASIC), as the controller 30.

In the present embodiment, an in-vehicle information analysis section 31, an incident angle calculation section 32, a sunlight intensity detection section 33, a scenery prediction section 34, a display information generation section 35, a shadow information generation section 36, a display control section 37 are achieved as functional blocks when the CPU of the controller 30 executes a predetermined program. Note that, it is also possible to appropriately use dedicated hardware such as an integrated circuit (IC) to implement the respective functional blocks.

The in-vehicle information analysis section 31 analyzes information on the in-vehicle space 11. Specifically, the in-vehicle information analysis section 31 generates information on the target region 30 (target region information) inside the glass windows 12, on the basis of output from the in-vehicle sensor 14 or the like. For example, the target region 20 is appropriately set in the in-vehicle space 11 inside the glass windows 12.

Here, the target region 20 is a region targeted for blocking the sunlight 2, and is a region shielded from light by the light shielding region 4 formed on the glass window 12. In other words, it can be said that the target region 20 is a region on which a shadow is cast. The shadow is generated when the sunlight 2 is blocked by the light shielding region 4.

The target region 20 is set around the occupant 1 who is in the in-vehicle space 11 in the vehicle 10. For example, the target region 20 is set to a portion of a body of the occupant 1 or a region in which the occupant 1 can move. This makes it possible to the shadow is formed near the occupant 1 when the sunlight 2 incident from the outside of the glass window 12 is blocked.

In the present embodiment, the target region 20 is set to eyes of the occupant 1, hands of the occupant 1, and a terminal device 5 used by the occupant 1. The target region 20 is set for each of the occupants 1 who are in the vehicle 10. This makes it possible to set a plurality of the target regions 20 in the in-vehicle space 11.

FIG. 1 schematically illustrates gray regions, which represents the target regions 20 set for the four respective occupants 1. The following process is performed in such a manner that the shadows are formed in the target regions 20.

For example, target regions f1, f2, f3, and f4 are set to eyes of the respective occupants 1 sitting on the front left seat, the front right seat, the rear left seat, and the rear right seat. The eyes of the occupant 1 means a region that covers at least a portion of a face (head) of the occupant 1 including the eyes of the occupant 1, for example. For example, as each of the target regions f1 to f4 of eyes, a region that covers a range from 100 degrees toward the left side of the face to 100 degrees toward the right side of the face is set on the assumption that a front direction of the face is set to zero degrees when the head of the occupant 1 is seen from above. Alternatively, the target regions f1 to f4 of the eyes may be appropriately set on the basis of ergonomics depending on a visual range in which the occupant 1 feels dazzled.

In addition, for example, target regions h1, h2, h3, and h4 are set to a hand of the respective occupants 1 sitting on the front left seat, the front right seat, the rear left seat, and the rear right seat. The hand of the occupant 1 means a region including a hand (palm) of the occupant 1, for example. Typically, the hand of the occupant 1 means a region in which the occupant 1 moves his/her hand in the vehicle 10, or the like. The target regions h1 to h4 of the hand are appropriately set on the basis of a range in which the occupant 1 moves his/her hand while the occupant 1 is sitting on a seat and facing the front side, for example. Alternatively, the target regions h1 to h4 of the hand may be appropriately set on the basis of the ergonomics depending on a range of movement of the occupant 1 or the like.

FIG. 1 schematically illustrates an example of setting the target regions h1 to h4 each of which includes a range where the occupant 1 sitting on the seat operates the mobile terminal 5. In other words, it can be said that each of the target regions h1 to h4 is set above the mobile terminal 5 (such as a smartphone or a tablet terminal) used by the occupant 1.

For example, the target region 20 is fixedly set near the occupant 1. In this case, each of the target regions f1 to f4 of eyes and the target region h1 to h4 of hand is set as a region that has a predetermined shape and size and that is disposed at a predetermined position in the in-vehicle space 11. By fixedly setting the target region 20, the region of blocking the sunlight 2 (region of casting a shadow of the light shielding region 4) are fixed. This makes it possible to easily calculate the light shielding region 4.

Note that, the target region 20 fixed near the occupant 1 may be adjustable depending on a reclining angle of a seat on which the occupant 1 sits or the like, for example. This makes it possible to appropriately form the shadow near the occupant 1 even in the case where the occupant 1 reclines the seat. Alternatively, a position or the like of setting the target region 20 may be adjusted depending on height or the like of the occupant 1. This makes it possible to shield the eyes from light in accordance with a position of the head of the occupant 1 or the like, and shield the hand from light in accordance with length of the hand.

In addition, for example, the target region 20 may be dynamically set in accordance with the position/posture or the like of the occupant 1 or the mobile terminal 5. For example, the eyes (head) of the occupant 1, a hand of the occupant, or the position/posture of the mobile terminal 5 may be detected (tracked) on the basis of the image captured by the in-vehicle camera, and the target region 20 may be set on the basis of a result of the detection. This makes it possible to set the target region 20 in accordance with behavior of the occupant 1, and it is possible to shield the eyes, hand (mobile terminal 5), and the like of the occupant 1 from light with high accuracy.

The in-vehicle information analysis section 31 analyzes the image or the like of the in-vehicle space 11 captured by using the in-vehicle sensor 14 (in-vehicle camera), for example, and generates target region information regarding the target region 20. As the target region information, information on the position of the target region 20 and the information on the shape and size of the target region 20 are generated. For example, in the case where the target region 20 is a fixed region, setting values such as the position, shape, size, and the like of the target region 20 are read. Alternatively, the position, shape, size, and the like of the target region 20 may be calculated on the basis of output from the angle sensor that detects the reclining angle.

In addition, the in-vehicle information analysis section 31 may dynamically set the target region 20. In this case, for example, the eyes, hand, or the like of the occupant 1 is tracked by using the in-vehicle camera, and the target region 20 is set. The set position, shape, size, and the like of the target region 20 are used as the target region information. Note that, the method of tracking the each potion (eyes, hand, or the like) of the occupant 1, the mobile object, or the like is not limited. For example, an image recognition process such as pattern matching, an identification process using machine learning, or the like may be used appropriately.

In addition, the in-vehicle information analysis section 31 generates state information of the target region 20 including information on contrast and information on brightness of the target region 20. For example, as the brightness of the target region 20, average luminance or the like of the target region 20 is calculated. In addition, for example, as the contrast of the target region 20, an luminance distribution width (luminance difference) or the like of the target region 20 is calculated.

As described above, the target region information generated by the in-vehicle information analysis section 31 includes information on the position of the target region 20, the shape and size of the target region, the brightness and contrast of the target region 20, or the like. The generated target region information is output to the shadow information generation section 36 and the display control section 37, which will be described later.

The incidence angle calculation section 32 calculates an angle of incidence of the sunlight 2 on the vehicle 10. The angle of incidence of the sunlight 2 on the vehicle 10 changes depending on the posture (direction) of the vehicle 10, the position of the sunlight 2, and the like. The incidence angle calculation section 32 calculates the angle of incidence of the sunlight 2 on the vehicle 10 in a coordinate system set for the vehicle 10 (vehicle coordinate system) by using the outside-vehicle sensor 15 and the vehicle sensor 16, for example. In other words, it can also be said that information on an incident direction of the sunlight 2 on the vehicle 10 is generated while being observed from the vehicle coordinate system.

For example, the angle of incidence of the sunlight 2 is calculated on the basis of output from the sun sensor installed as the outside-vehicle sensor 15. Alternatively, the angle of incidence may be calculated on the basis of the image captured by the outside-vehicle camera.

In addition, for example, it is possible to calculate a position or the like of the sun 3 in map coordinates (world coordinates), a position of the sun 3 in celestial coordinates, or the like from information on a current time and a current position (GPS output) of the vehicle 10. The angle of incidence of the sunlight 2 in the vehicle coordinate system is calculated from information on the position of the sun 3, the position/posture of the vehicle 10 detected by the vehicle sensor 16, and the like.

Note that, the angle of incidence of the sunlight 2 varies depending on movement of the vehicle 10. Therefore, a process of appropriately correcting the angle of incidence in the vehicle coordinate system or the like is performed in accordance with change in speed, acceleration, posture, or the like of the vehicle 10. In addition, the process of calculating the angle of incidence of the sunlight 2 on the vehicle 10 is not limited.

The sunlight intensity detection section 33 detects intensity of the sunlight 2 incident on the vehicle 10. The intensity of the sunlight 2 changes depending on weather and time. In addition, actual intensity of the sunlight 2 incident on the vehicle changes depending on an external environment (for example, forest area, area in a tunnel, or the like) where the vehicle 10 moves. The sunlight intensity detection section 33 detects such actual intensity of the sunlight 2 incident on the vehicle 10, on the basis of output from the sun sensor or the outside-vehicle camera installed as the outside-vehicle sensor 15.

For example, luminance or the like of the sunlight 2 is directly detected by using the sun sensor. Alternatively, the intensity (brightness) of the sunlight 2 may be estimated on the basis of luminance of the image captured by the outside-vehicle camera, an exposing condition for autoexposure, or the like. Alternatively, illuminance detected by using the illuminance sensor or the like many be used as the intensity of the sunlight 2. Note that, the method of detecting the intensity of the sunlight 2 or the like is not limited.

The scenery prediction section 34 predicts scenery of the external environment around the vehicle 10 and generates scenery information related to scenery around the vehicle 10. The scenery around the vehicle 10 is scenery viewed by the occupant 1 who is in the in-vehicle space 11, for example. Therefore, the scenery prediction section 34 predicts scenery of the external environment seen from the in-vehicle space 11.

For example, information on the current position of the vehicle 10 detected by the navigation device 17 is used for the process of predicting the scenery. For example, the scenery prediction section 34 detects a geographical situation around the current position on the basis of predetermined map data or the like. Specifically, text information is appropriately extracted from the map data or the like. Note that, the map data may be data stored in the navigation device 17 or may be data acquired via a network or the like.

For example, in the case of driving near a forest park, keywords such as "forest" and "park" are extracted. Alternatively, for example, in the case of driving near an animal park, a keywords such as "animal" is extracted. In addition, instead of extracting the text information, keywords such as "river", "sea", and "water" may be extracted while driving near a river or a coast.

In addition, for example, scenery information (such as keywords related to scenery) may be detected on the basis of an image captured by the outside-vehicle camera serving as the outside-vehicle sensor 15. For example, keywords such as "tree", "woods", "forest", and "mountain" are extracted in the case where the vehicle 10 travels in a forest or woods and an image of trees is captured. Such a process can be implemented as an image recognition process using machine learning or the like, for example. Note that, the method of extracting keywords related to scenery is not limited.

As described above, in the present embodiment, the information on the target region 20 inside the glass windows 12 of the vehicle 10, and the information on the external environment outside the vehicle 10 including the information on the sunlight 2 incident on the glass window 12 are acquired. In the present embodiment, the acquisition section includes the in-vehicle information analysis section 31, the incident angle calculation section 32, the sunlight intensity detection section 33, and the scenery prediction section 34.

The display information generation section 35 generates display information displayed in the light shielding region 4. Here, the display information is text information such as time or a message, or illustration information using an icon or the like, for example. With regard to the light shielding region 4, a region with low transmittance (region with a high rate of blocking the sunlight 2) is a darker region than the other region. By using such a state, it is possible to display predetermined display information in the light shielding region 4. In other words, it can be said that the display information is additional information displayed in the light shielding region 4.

The display information generation section 35 generates information on planned driving time it takes to arrive at a destination, predicted arrival time at the destination, or the like, on the basis of output from the navigation device 17, for example. Alternatively, information on a message, icon, or the like notifying of a state of the vehicle 10 is generated. The type, content, and the like of the display information is not limited. For example, any displayable information may be generated as the display information by using the light shielding region 4.

The shadow information generation section 36 sets respective display parameters such as shape, size, light shielding pattern, transmittance, rough density, and the like of the light shielding region 4. For example, the shape and size of the light shielding region 4 is calculated on the basis of the incident direction (angle of incidence) of the sunlight 2 and the shape and size of the target region 20. Note that, in the case where the shape 8 or size) of the target region is not detected or other cases, the shape (or size) of the light shielding region 4 may be set as a predetermined default value.

In addition, transmittance of the target region 20 is set on the basis of the intensity of the sunlight 2, brightness (average luminance) or the like of the target region 20, or the like. In addition, rough density or the like (to be described later) is set on the basis of contrast (luminance difference) or the like of the target region 20. This makes it possible to set a density or the like of a shadow cast on the target region 20 in accordance with intensity of the sunlight 2 and a state of the target region 20.

In addition, the shadow information generation section 36 sets a light shielding pattern of the light shielding region 4 on the basis of scenery information generated by the scenery prediction section 34. Here, for example, the light shielding pattern is an illustration (pattern) made by a difference in transmittance. Therefore, for example, the light shielding region 4 formed on the glass window 12 displays a light shielding pattern represented by lighting and shading depending on the difference in transmittance.

Note that, sometimes the light shielding region 4 displays the display information such as time or a message. In this case, the shadow information generation section 36 calculates the light shielding region 4 in such a manner that the light shielding region 4 includes the predetermined display information. This makes it possible to display the display information by lighting and shading the glass window 12.

As described above, the shadow information generation section 36 sets the respective display parameters for displaying the light shielding region 4 on the glass window (light shielding unit 13). Note that, data of the light shielding region 4 can be treated as image data representing transmittance by using grayscale gradation, for example. In this case, it can be said that the shadow information generation section 36 generates image data of the light shielding region 4.

The display control section 37 controls display of the light shielding region 4 on the light shielding unit 13. For example, a glass window 12 on which the light shielding region 4 will be displayed is selected on the basis of a relationship between an angle of incidence (incident direction) of the sunlight 2 on the vehicle 10 and a position of the target region 20, and a display position on the glass window 12 is calculated. In other words, the display control section 37 calculates the position of the light shielding region 4 on the glass window 12 on the basis of the incident direction of the sunlight 2 and the position of the target region 20.

For example, the display control section 37 generates a control signal for controlling the light shielding unit 13 in such a manner that the image data of the light shielding region 4 generated by the shadow information generation section 36 is displayed on an appropriate position on an appropriate glass window 12. For example, the control signal is input to a driving unit (not illustrated) that outputs voltage or the like for driving the light shielding unit 13. As a result, the light shielding region 4 formed on each of the glass windows 12 by the light shielding unit 13, and the target regions 20 are shielded in the in-vehicle space 11.

As described above, the shadow information generation section 36 and the display control section 37 calculate the light shielding region 4 that shield the target region 20 from light by blocking the sunlight 2 on the glass window 12, on the basis of the information on the target region 20 and the information on the external environment. In the present embodiment, a calculation section is implemented when the shadow information generation section 36 and the display control section 37 operate in cooperation with each other.

Figure 3:
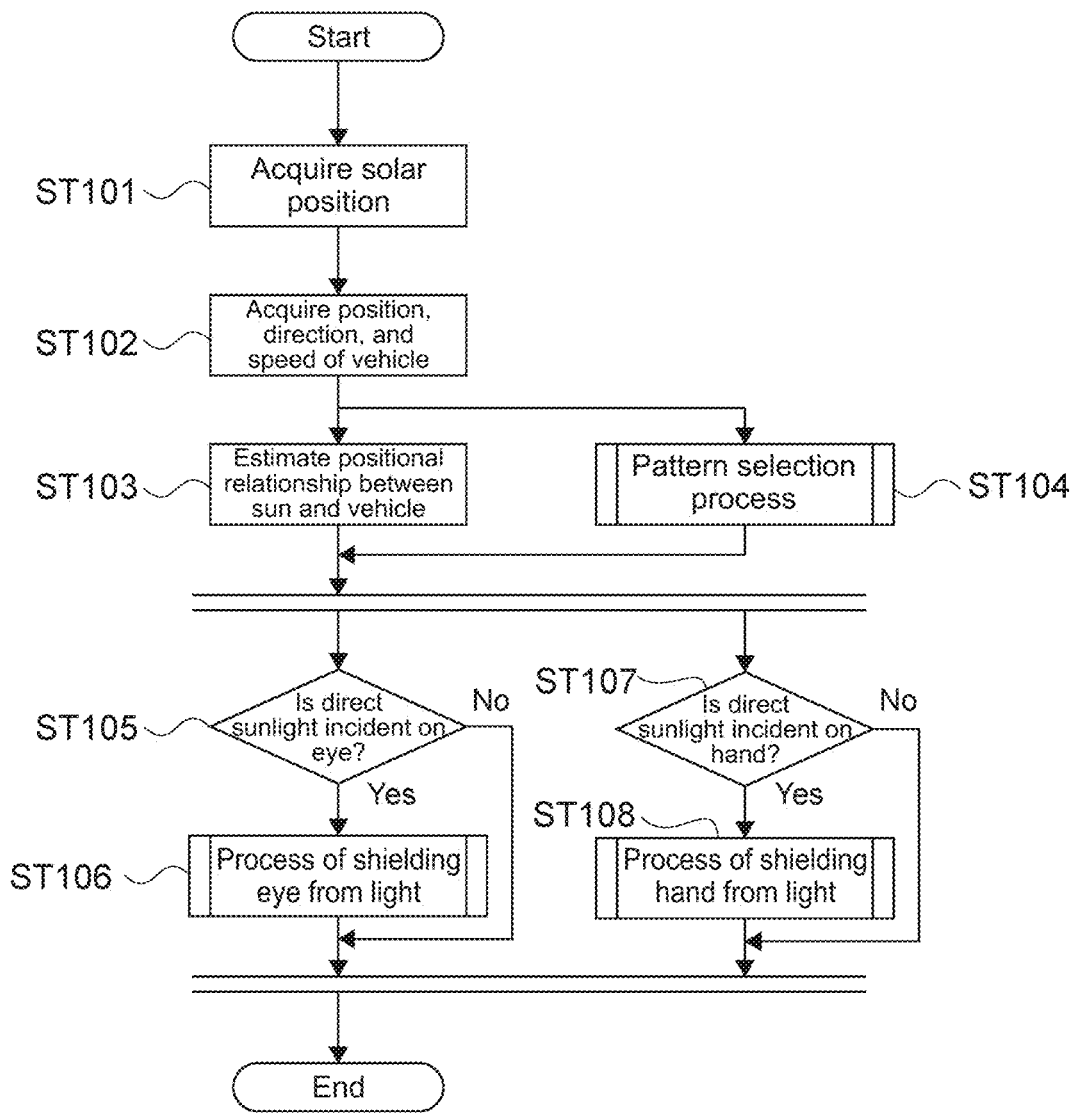
FIG. 3 is a flowchart illustrating operation of the light shielding control system.

FIG. 3 is a flowchart illustrating an example of operation of the light shielding control system 100. The process illustrated in FIG. 3 is a loop process repeatedly performed with predetermined frequency while the vehicle 10 is activated, for example.

First, a current position of the sun 3 (solar position) is acquired (Step 101). For example, the solar position is directly detected by using the sun sensor (outside-vehicle sensor 15). Alternatively, the solar position relative to a current position of the vehicle 10 is detected on the basis of current time and the current position of the vehicle 10.

The position, direction (posture), speed, and the like of the vehicle 10 are acquired (Step 102). For example, the current position of the vehicle 10 is detected by using the GPS sensor. In addition, a process of detecting the direction of the vehicle 10 is performed. For example, a traveling direction of the vehicle 10 is calculated from an immediately preceding position of the vehicle 10 and the current position of the vehicle, and the direction of the vehicle 10 is detected on the basis of the traveling direction.

Note that, the direction of the vehicle 10 is a direction of the vehicle 10 in map coordinates (world coordinates), for example. In other words, it is detected which cardinal/intercardinal direction a front/rear direction of the vehicle 10 goes along. The process of detecting the direction of the vehicle 10 can be easily performed by recording a route taken by the vehicle 10, for example. Alternatively, the direction of the vehicle 10 may be detected by using the geomagnetic sensor or the like, for example.

In addition, the speed of the vehicle 10 is detected on the basis of the speed sensor and a sensor for detecting the number of revolutions of a wheel, engine, motor, or the like. In addition, tilt or the like from front to back and from left to right relative to a horizontal plane is detected as the posture of the vehicle 10 by using the gyro sensor, IMU, or the like.

A positional relationship between the sun 3 and the vehicle 10 is estimated (Step 103). Specifically, the incident angle calculation section 32 calculates an angle of incidence (incident direction) of the sunlight 2 on the vehicle 10 on the basis of the information acquired in Step 102.

As described above, the angle of incidence of the sunlight 2 is estimated by using the vehicle coordinate system set for the vehicle (in-vehicle space 11), for example. For example, an azimuth of the sun 3 is calculated on the basis of the front/rear direction of the vehicle 10. For example, the azimuth of the sun 3 is zero degrees when the vehicle 10 travels toward the south in a state where the sunlight 3 culminates. Alternatively, when the vehicle 10 travels toward the east in a state where the sunlight 3 culminates, the sun 3 is on the right side of the vehicle 10 and the azimuth of the sun 3 is 90 degrees.

In addition, an elevation angle indicating height of the sun 3 is calculated on the basis of a reference plane of the vehicle 10 including the front/rear direction and a left/right direction of the vehicle 10. Note that, the reference plane is a plane parallel to a horizontal plane in the case where the vehicle 10 is on the horizontal plane, for example. An angle of the sun 3 relative to the reference plane is calculated as the elevation angle. Note that, in the case where the vehicle 10 travels on a tilted surface (such as an uphill or downhill), it is possible to properly calculate an elevation angle of the sun 3 relative to the reference plane by correcting the tilt.

As described above, the azimuth, the elevation angle, and the like are calculated as the angle of incidence of the sunlight 2. These angles change continuously with movement of the vehicle 10. Therefore, the process of appropriately correcting the angle of incidence of the sunlight 3 is performed by using speed or the like of the vehicle 10. In addition, the process of estimating the angle of incidence (incident direction) of the sunlight 2 is not limited. For example, a process or the like of estimating a vector or the like representing the incident direction of the sunlight 2 may be performed.

Figure 4:
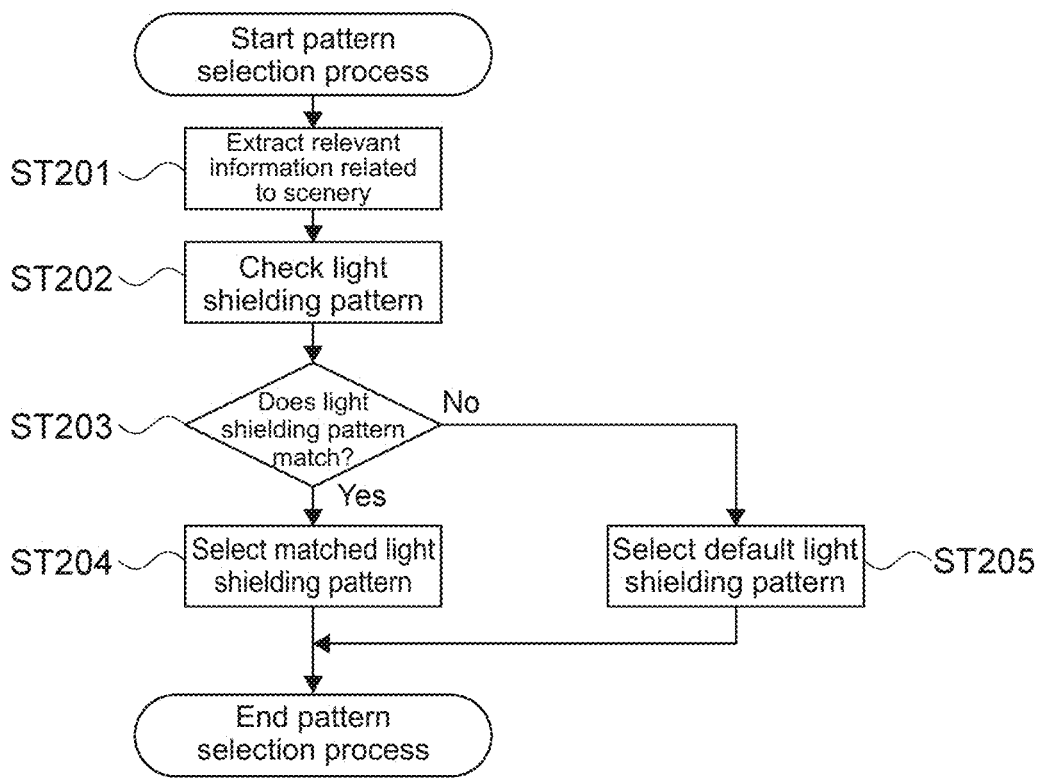
FIG. 4 is a flowchart illustrating an example of a pattern selection process.

In addition, in parallel with Step 103, a pattern selection process of selecting a light shielding pattern of the light shielding region 4 is performed (Step 104). FIG. 4 is a flowchart illustrating an example of the pattern selection process. Next, details of the pattern selection process will be described with reference to FIG. 4.

The scenery prediction section 34 extracts relevant information related to scenery of the external environment around the vehicle 10 (Step 201). For example, a keyword (such as mountain, sea, or animal) characterizing the scenery is extracted from words in a map with reference to the map data or the like on the basis of the information on the current position of the vehicle 10 detected in Step 101. As described above, it is possible to easily acquire information on the scenery around the vehicle 10 by extracting a word in the map near a position where the vehicle 10 is traveling.

Note that, the method of extracting the keyword from the map data or the like is not limited. For example, a library or the like including words related to scenery is stored in advance. Next, a word that coincides with a word included in the library is extracted from the map data as the keyword. In addition, the present technology is not limited to the case where the single keyword is extracted. For example, a plurality of keywords may be extracted. In addition, any method of extracting keywords related to scenery may be used.

After the keyword related to the scenery is extracted, a light shielding pattern appropriate to the keyword related to the scenery is checked (Step 202).

The light shielding control system 100 stores a plurality of light shielding patterns. Some of the plurality of light shielding patterns are provided with tag information. The tag information is a keyword related to each light shielding pattern. For example, a plurality of tags is attached to each light shielding pattern. Note that, the stored light shielding patterns include a light shielding pattern without the tag information.

In Step 202, it is determined whether or not there is a tag that coincides with the keyword related to the scenery, with reference to the tag information of the respective light shielding patterns. Alternatively, a tag in a similar category to the keyword related to the scenery is searched for. For example, in the case where the keyword is "cat", a tag "animal" is determined to be the tag in the similar category. Note that, sometimes the tag that coincides with the keyword related to the scenery is not found.

Hereinafter, details of the respective light shielding patterns used in the light shielding control system 100 will be described.

In the present embodiment, a light shielding pattern in which distribution of transmittance is not even (coarse/fine pattern) is used as the light shielding pattern. The coarse/fine pattern is a pattern including a portion that blocks the sunlight 2 and a portion that is transparent to the sunlight 2. Therefore, the coarse/fine pattern is a pattern whose transmittance changes discontinuously in the light shielding region 4.

FIGS. 5A, 5B, 5C, and 5D are examples of the coarse/fine pattern using a geometric form. FIGS. 5A, 5B, 5C, and 5D illustrate coarse/fine patterns 41a using geometric forms with different rough density. The coarse/fine patterns 41a illustrated in FIGS. 5A, 5B, 5C, and 5D are light shielding patterns 40 without specific tag information.

For example, as illustrated in FIG. 5A, the coarse/fine pattern 41a using the geometric form includes a plurality of criterion patterns 42s (black regions in FIG. 5A) with low transmittance. In the coarse/fine pattern 41a, the square criterion patterns 42a in a same size are arrayed at predetermined intervals in a grid like form. In addition, the intervals around the respective criterion pattern 42a serve as a transparent region 43 with high transmittance (such as 100%), which is transparent to the sunlight 2.

As described above, the coarse/fine pattern 41a includes the criterion patterns that are disposed at intervals (transparent regions 43) in the light shielding region 4 to block the sunlight 2. In the examples illustrated in FIGS. 5A, 5B, 5C, and 5D, the criterion patterns 42a functions as light shielding blocks 44 for blocking outside light.

In the coarse/fine pattern 41a, the light shielding pattern 40 for blocking the sunlight 2 is configured by repeating the criterion patterns 42a with the same geometric form. Therefore, it is possible to easily deal with any shape of shadows. In other words, it is possible to easily form the light shielding region 4 in which a shadow is generated, regardless of shape of the light shielding region 4. The shadow has desired brightness (density) and contrast.

Note that, the criterion pattern 42s using the geometric form is not limited to the square form. For example, the criterion pattern 42a may have a rectangular shape, or any polygonal shape such as a triangular shape, a pentagonal shape, or a hexagonal shape. In addition, for example, geometric forms including a curve such as a circular shape or an oval shape may be used. In addition, the array of the criterion patterns 42a is not limited to the grid like form. For example, it is possible to use any periodic or non-periodic array in which the criterion patterns 42a can be disposed repeatedly, for example.

In addition, as illustrated in FIGS. 5A, 5B, 5C, and 5D, it is possible to adjust rough density of the coarse/fine pattern 41a. Here, the rough density means sizes of intervals between the criterion patterns 42s. For example, the sizes of intervals corresponds to an area occupied by the criterion patterns 42a in the light shielding region 4, for example. In other words, the rough density means a ratio of the criterion patterns 42a in the light shielding region 4. FIGS. 5A, 5B, 5C, and 5D are respective examples of the coarse/fine pattern 41a using a geometric form obtained in cases where the rough density is in a range from 0% to 25%, a range from 25% to 50%, a range from 50% to 70%, a range from 70% to 100%.

For example, in the case where the rough density is set to 100% as illustrated in FIG. 5D, the area occupied by the criterion patterns 42a (ratio of the criterion patterns 42a) is 100% (area of the transparent regions 43). Conversely, as lower rough density is set, the criterion patterns 42a occupy a smaller area, and the transparent regions 43 occupy a larger area. Therefore, for example, the shadow gets darker as the rough density gets higher, and the shadow gets lighter as the rough density gets lower.

Note that, the method of increasing (decreasing) the rough density is not limited. For example, in comparison with FIG.

5A, the area of the criterion patterns 42a is increased in FIG. 5B. In addition, for example, in comparison with FIG. 5B, the area of the criterion patterns 42a is not changed but the number of criterion patterns 42a is increased in FIG. 5C. As described above, it is possible to obtain desired rough density by appropriately changing the area, number, array, or the like of the criterion patterns 42a.

In the present embodiment, for example, the coarse/fine pattern 41a having the plurality of levels of rough density illustrated in FIGS. 5A, 5B, 5C, and 5D is stored in advance. Accordingly, it is possible to easily switch densities, distributions, and the like of the shadow by designating one of the levels of rough density. Note that, it is also possible to appropriately calculate a coarse/fine pattern 41a having a designated rough density.

FIGS. 6A, 6B, 6C and 6D are examples of a coarse/fine pattern 41 using a group motif. FIGS. 6A, 6B, 6C, and 6D illustrate coarse/fine patterns 41b using geometric forms with different rough density.

The group motif is an example of using a plurality of criterion patterns 42b representing a figurative motif such as a leaf or a fish. For example, a figurative motif related to certain scenery is used as the criterion pattern 42b. In the examples illustrated in FIGS. 6A, 6B, 6C, and 6D, a criterion pattern 42b (coarse/fine pattern 41b) having a leaf motif.

The coarse/fine pattern 41b having the leaf motif is provided with tags such as "tree, mountain, forest, nature, relax, autumn, green, and park". Such tags are keywords related to scenery associated with the leaf motif, for example.

From another perspective, it can be said that the criterion patterns 42b having the leaf motif is used as the pattern related to scenery associated with these tags (relevant pattern). As described above, the criterion pattern 42b is a relevance pattern related to scenery. In addition, the coarse/fine pattern 41b is a group pattern formed of the plurality of criterion patterns 42b.

Figure 6A:
FIGS. 6A, 6B, 6C, and 6D are examples of a coarse/fine pattern using a group motif.
Figure 6B:
Figure 6C:
Figure 6D:
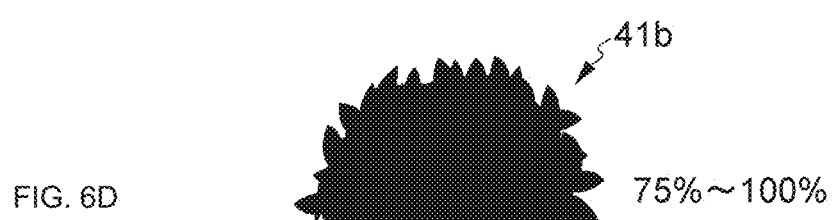

The group pattern (coarse/fine pattern 41b) controls its rough density using the number of criterion patterns 42b, for example. For example, in FIG. 6A, a coarse/fine pattern 41b with low rough density is formed of sparse leaves (criterion patterns 42b). In addition, as illustrated in FIGS. 6B, 6C, and 6D, the area of the transparent region 43 is reduced and the rough density is increased by increasing the number of leaves (criterion patterns 42b) included in a predetermined range, for example.

In addition, in the group pattern, the criterion patterns 42b are randomly disposed. This makes it possible to possible to easily cast a shadow having desired brightness and contrast, regardless of shape of the light shielding region 4. In the examples illustrated in FIGS. 6A, 6B, 6C, and 6D, the criterion patterns 42b functions as light shielding blocks 44 for blocking outside light.

FIGS. 7A, 7B, 7C, and 7D are examples of a coarse/fine pattern using a figurative motif. FIGS. 7A, 7B, 7C, and 7D illustrate coarse/fine patterns 41c using figurative motifs with different rough density.

For example, the motifs are figurative motifs related to scenery. The coarse/fine pattern 41c is a pattern having an animal (cat) motif, and the coarse/fine pattern 41c is configured to represent a silhouette of cat serving as the figurative motif as a whole. Therefore, the coarse/fine pattern 41c serves as a relevant pattern related to scenery.

The coarse/fine pattern 41c forming the silhouette of cat is provided with tags such as "cat, animal, child, play, and cute". Such tags are keywords related to scenery associated with the cat motif, for example.

When using such a light shielding pattern 40 (coarse/fine pattern 41c) that forms a figurative silhouette as a whole, it is possible to increase/decrease its rough density by making portions inside the silhouette transparent while a rough shape of the silhouette remains, for example. In other words, the coarse/fine pattern 41c includes light shielding parts 45 and transparent regions 43 to form a silhouette with low transmittance. In the examples illustrated in FIGS. 7A, 7B, 7C, and 7D, the light shielding parts 45 included in the silhouette functions as the light shielding blocks 44 for blocking outside light.

Figure 7A:
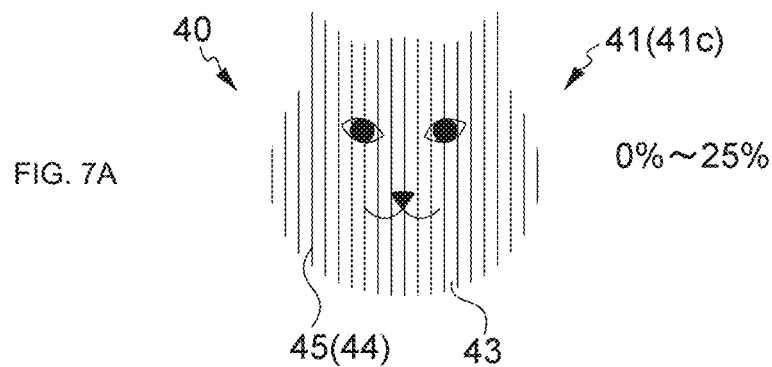
FIGS. 7A, 7B, 7C, and 7D are examples of a coarse/fine pattern using a figurative motif.
Figure 7B:
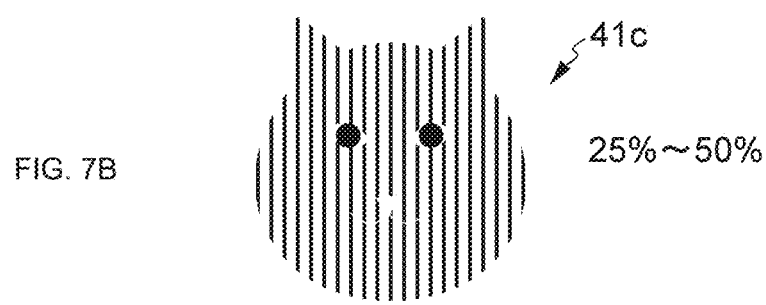

For example, in FIG. 7A, the transparent regions 43 forms a stripe structure. In addition, by narrowing widths of the stripes of the transparent region 43 as illustrated in FIG. 7B, it is possible to increase the area of the light shielding portion (black portions), and this increases its rough density.

Figure 7C:
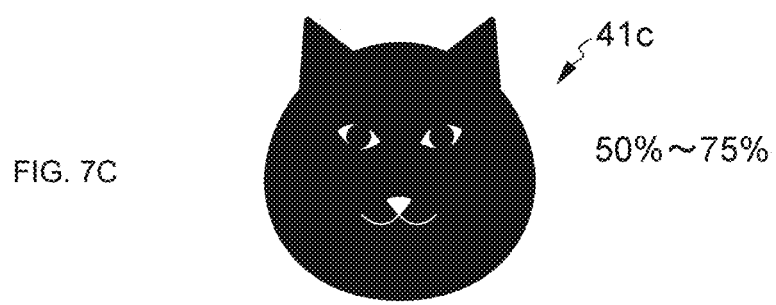
Figure 7D:
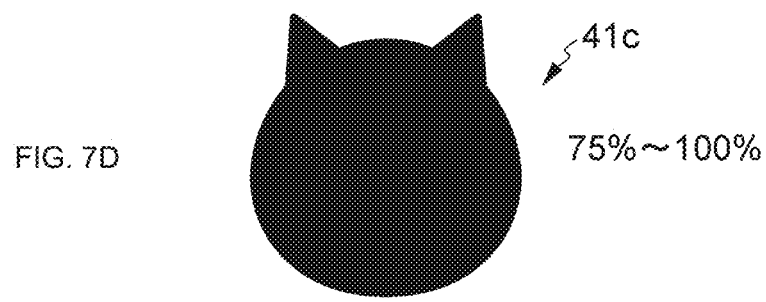

In addition, in FIG. 7C, portions corresponding to eyes, nose, mouth, and the like of the cat are transparent (transparent regions 43) inside the silhouette. In addition, in FIG. 7D, no transparent region 43 is formed inside the silhouette, and the whole silhouette (light shielding section 45) has predetermined transmittance. As described above, it is possible to appropriately set rough density even in the case of using a single figurative motif.

FIGS. 8A, 8B, 8C, and 8D are examples of a coarse/fine pattern for displaying information. FIGS. 8A, 8B, 8C, and 8D illustrate coarse/fine patterns 41d with different rough density for displaying information. The coarse/fine patterns 41d illustrated in FIGS. 8A, 8B, 8C, and 8D are light shielding patterns 40 without specific tag information.

In the coarse/fine patterns 41d for displaying information, background regions 46 for representing a whole shape (silhouette) is set. The background region 46 includes stripe light shielding sections 45 and stripe transparent regions 43. In addition, for example, the background region 46 includes information display section 47 configured to display shape of a text, illustration, or the like. In FIGS. 8A, 8B, 8C, and 8D, the information display section 47 for displaying time is included. Note that, the information displayed on the information display section 47 is the display information generated by the display information generation section 35 described with reference to FIG. 2.

Figure 8A:
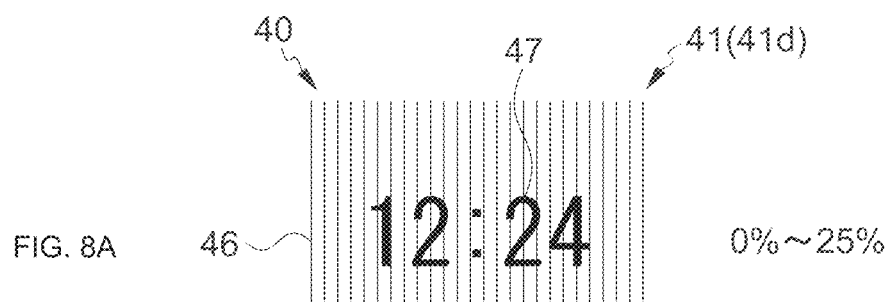
FIGS. 8A, 8B, 8C, and 8D are examples of a coarse/fine pattern for displaying information.

In the example illustrated in FIG. 8A, the information display section 47 has low transmittance similar to the light shielding sections 45. In this case, the time displayed on the information display section 47 is displayed as a dark region on the glass window 12 (light shielding region 4). In other words, the time is displayed by using black characters. In this case, it can be said that the information display section 47 functions as the light shielding section 45.

Figure 8B:
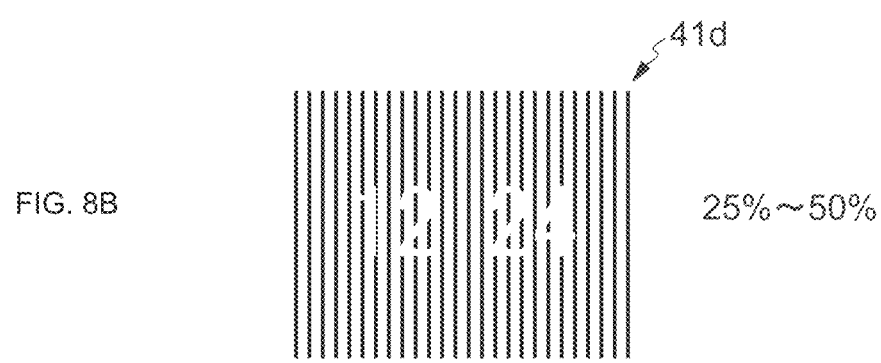
Figure 8C:
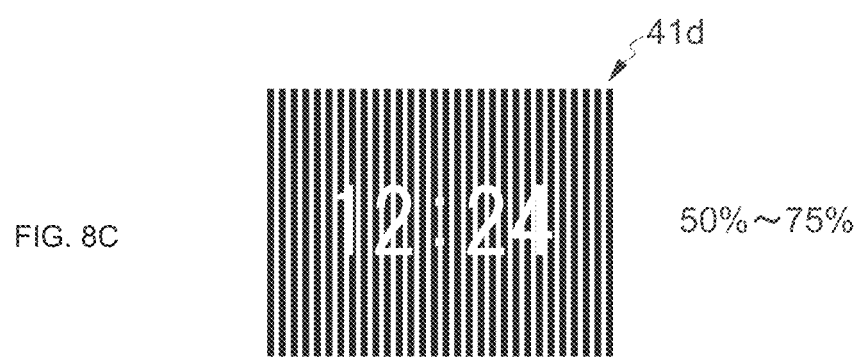
Figure 8D:
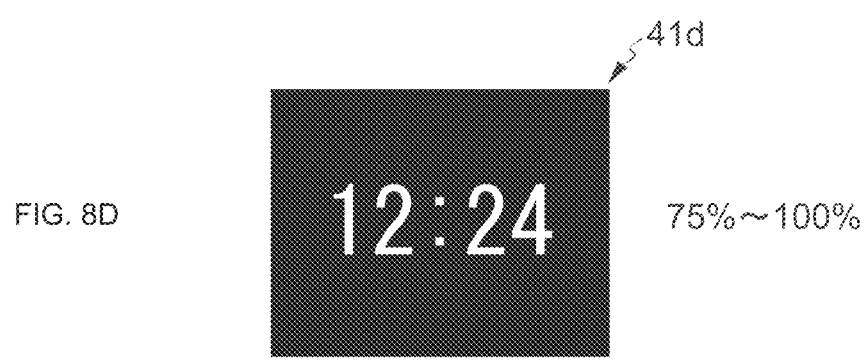
Figure 9A:
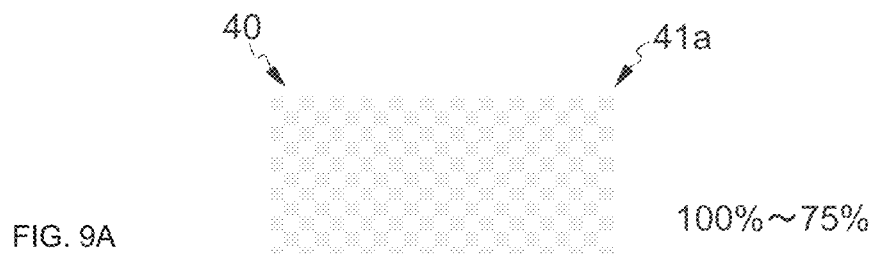
FIGS. 9A, 9B, 9C, and 9D are examples of a coarse/fine pattern with adjusted transmittance.
Figure 9B:
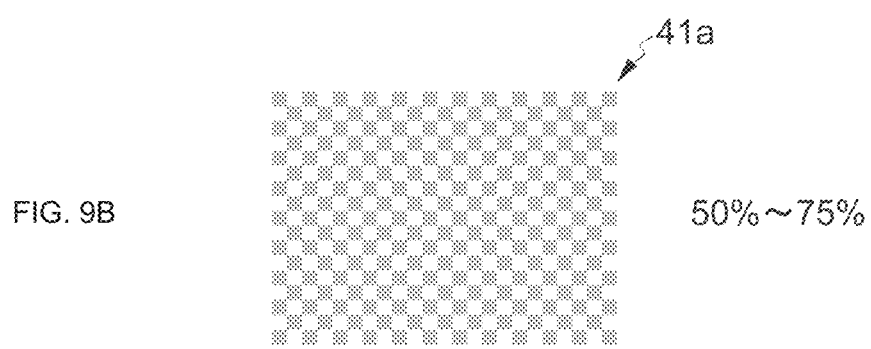
Figure 9C:
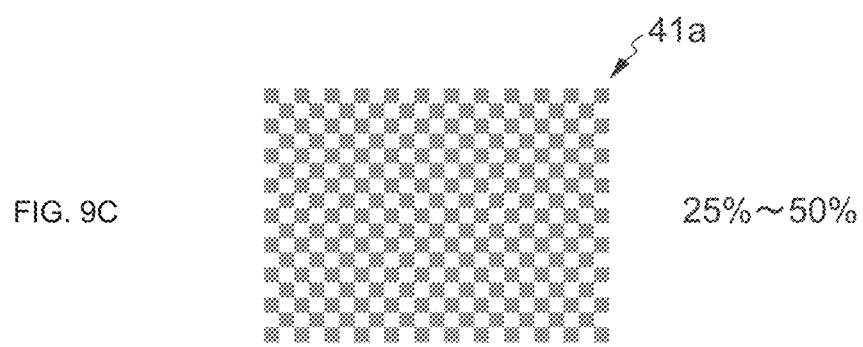
Figure 9D:
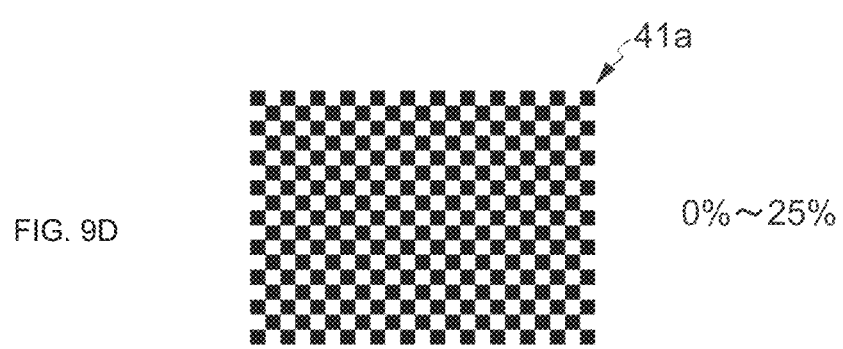
Figure 10A:
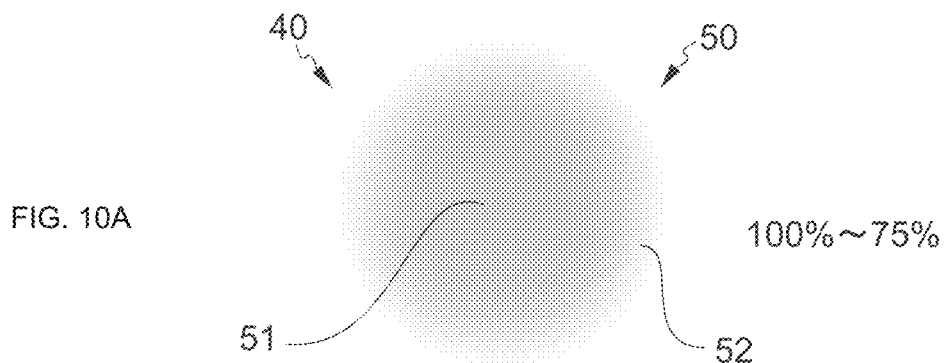
FIGS. 10A, 10B, 10C, and 10D are examples of a gradation pattern.
Figure 10B:
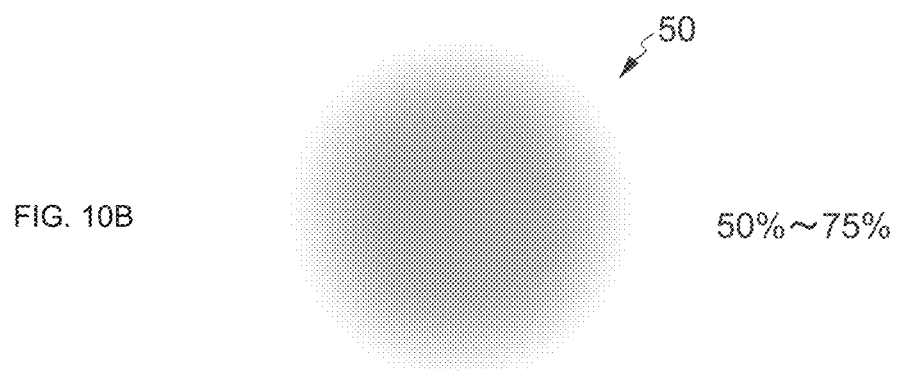
Figure 10C:
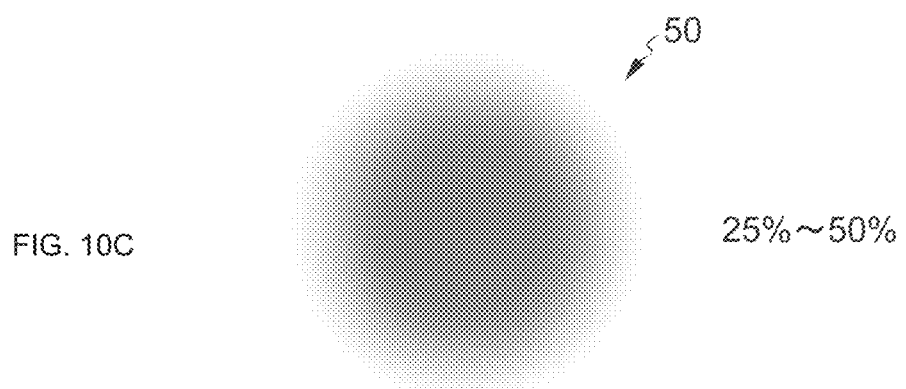
Figure 10D:
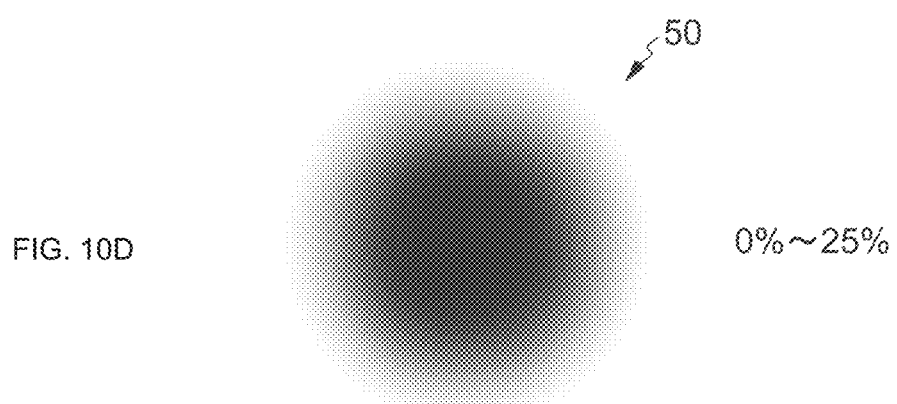

In addition, in the example illustrated in FIG. 8B, the information display section 47 has high transmittance similar to the transparent region 43. In this case, the time displayed on the information display section 47 is displayed as a bright region on the glass window 12 (light shielding region 4). In other words, the time is displayed as transparent characters. As described above, in the case of low rough density, a portion corresponding to the text and illustration serving as the information display section 47 has low transmittance. Alternatively, in the case of high rough density, the portion has high transmittance.

Note that, as illustrated in FIGS. 8A, 8B, 8C, and 8D, the rough density of the coarse/fine pattern 41d is increased by thickening widths of the stripe light shielding sections 45. This makes it possible to easily adjust the rough density while displaying necessary information. In the examples illustrated in FIGS. 8A, 8B, 8C, and 8D, the light shielding portions 45 function as the light shielding blocks 44 for blocking outside light.

FIGS. 9A, 9B, 9C, and 9D are examples of a coarse/fine pattern with adjusted transmittance. Hereinafter, description will be given with reference to a coarse/fine pattern 41*a* using the geometric form illustrated in FIG. 5C with the rough density of 50% to 70%, as the example of the coarse/fine pattern 41.

FIGS. 5A, 5B, 5C, 5D, 6A, 6B, 6C, 6D, 7A, 7B, 7C, 7D, 8A, 8B, 8C, 8D, 9A, 9B, 9C, and 9D are respective examples of the coarse/fine pattern 41*a* using the geometric form obtained in cases where the coarse/fine pattern 41*a* has transmittance of 0% to 25%, 25% to 50%, 50% to 70%, and 70% to 100%. The respective diagrams in FIGS. 9A, 9B, 9C, and 9D indicate the transmittance by using grayscales. As the gray gets darker, the transmittance becomes lower. For example, in the case where the transmittance is 100%, the coarse/fine pattern 41*a* is substantially transparent to incident light. In the case where the transmittance is 0%, the coarse/fine pattern 41*a* blocks most of the incident light.

For example, it is assumed that a dark coarse/fine pattern 41*a* having transmittance of 0% (see FIG. 9C) is displayed in a state where intensity of the sunlight 2 is not so strong. In this case, there is a possibility that the occupant 1 in the in-vehicle space 11 views a darker checkered silhouette on the glass window 12 and has a feeling of strangeness. Alternatively, a coarse/fine pattern 41*a* having transmittance of 100% also blocks light other than the sunlight 2. Therefore, The coarse/fine pattern 41*a* having transmittance of 100% may possibly disturb viewing scenery of the external environment around the vehicle 10, for example.

In this case, a process of decreasing the transmittance of the coarse/fine pattern 41*a* is performed as described later. This makes it possible to block the sunlight 2 at an appropriate rate tailored to the intensity of the sunlight 2. In addition, the silhouette formed on the glass window 12 is displayed translucently. This makes it possible to reduce the feeling of strangeness regarding vision of the occupant 1 and continues viewing scenery of the external environment around the vehicle 10.

Note that, as illustrated in FIGS. 9A, 9B, 9C, and 9D, it is possible to adjust transmittance of the respective coarse/fine patterns 41*a* to 41*d* described with reference to FIGS. 5A, 5B, 5C, 5D, 6A, 6B, 6C, 6D, 7A, 7B, 7C, 7D, 8A, 8B, 8C, and 8D. In addition, it is also possible to adjust transmittance even in the case of different rough density.

FIGS. 10A, 10B, 10C, and 10D are examples of a gradation pattern. In the present embodiment, a gradation pattern 50 is used as the light shielding pattern 40. The gradation pattern 50 has transmittance that continuously changes in the light shielding region 4. In other words, it can be said that the gradation pattern 50 is a pattern whose transmittance is continuously distributed without any rough density and is a pattern having the rough density of 100%. Note that, the gradation patterns 50 illustrated in FIGS. 10A, 10B, 10C, and 10D are light shielding patterns 40 without specific tag information.

The gradation pattern 50 includes a central region 51 and a peripheral region 52. The central region 51 has substantially fixed transmittance, and the peripheral region 52 has transmittance that changes smoothly. FIG. 10A to FIGS. 10B 10C and 10D illustrate respective examples of the gradation pattern 50 obtained in cases where the central region 51 has transmittance of 0% to 25%, 25% to 50%, 50% to 70%, and 70% to 100%.

The gradation pattern 50 is a substantially circular pattern including the substantially circular central region 51. In addition, the peripheral region 52 surrounding the central region 51 has transmittance that continuously decreases toward the outside. In other words, the peripheral region 52 is a region of achieving gradation, in which transmittance gradually decreases.

In the peripheral region 52, a rate of reduction of the transmittance is set by using an effect of blurring an outline (such as blur effect) used for an image processor the like, for example. In other words, it can be said that the peripheral region 52 is a region obtained by blurring an outline of the central region 51. As described above, when the light shielding pattern 40 (gradation pattern 50 with the blurred outline is displayed on the glass window 12, it becomes difficult to recognize the light shielding pattern 40 itself, and this makes it possible to reduce the feeling of strangeness regarding vision of the occupant 1, for example.

In addition, as illustrated in FIG. 10A to FIGS. 10B, 10C, and 10D, the gradation pattern 50 is capable of blocking the sunlight 2 at a proper rate by changing the transmittance of the central region 51. A shadow obtained when the sunlight 2 is blocked by the gradation pattern 50 is a continuous shadow with no hole (sunlight spot) whose outline is blurred. Note that, the shape of the gradation pattern 50 is not limited to the circular shape. For example, any shape tailored to the shape of the target region 20 may be used, for example.

Returning to FIG. 4, after the process of checking the light shielding pattern 40 in Step 202 finishes, it is determined whether or not the light shielding pattern 40 matches (Step 203).

For example, it is assumed that the vehicle 10 travels in the mountain forest district, and the keyword "mountain" (scenery information) is extracted from the map data of the vehicle 10. In this case, for example, a coarse/fine pattern 41*b* (see FIGS. 6A, 6B, 6C, and 6D) that is provided with the tag "mountain" and that serves as the light shielding pattern 40 matches with the keyword regarding the scenery. As described above, in the case where there is the light shielding pattern 40 that matches with the scenery of the external environment around the vehicle 10 (Yes in Step 230), the matched light shielding pattern 40 is selected (Step 204). Specifically, information on the light shielding pattern 40 that matches with the keyword regarding the scenery (Such as an ID or number) is stored.

As described above, in the present embodiment, a light shielding pattern 40 with the tag related to the keyword of scenery is selected from among the plurality of the light shielding patterns 40 with tags related to scenery. By using the tag for selecting the light shielding pattern 40, it is possible to easily select the light shielding pattern 40 tailored to the external environment around the vehicle 10.

Alternatively, in the case where there is no light shielding pattern 40 that matches with the scenery of the external environment around the vehicle 10 (No in Step 230), a default light shielding pattern 40 is selected (Step 205). In the present embodiment, for example, the coarse/fine pattern 41*a* using the geometric form described above with reference to FIGS. 5A, 5B, 5C, and 5D are set as the default light shielding pattern 40. After the light shielding pattern 40 is selected in Step 204 or Step 205, the pattern selection process ends.

Returning to FIG. 3, an angle of incidence of the sunlight 2 relative to the vehicle 10 is calculated (Step 103), and the light shielding pattern 40 is selected (Step 104). Subsequently, a process of shielding the eyes of the occupant 1 and a process of shielding the eyes of the occupant are performed in parallel with each other. The parallel processes are processes performed on each occupant 1 who is in the vehicle 10. Note that, when the parallel processes end, the process returns to Step 101 and a next loop process starts.

In the process of shielding the eyes of the occupant 1, it is determined whether or not the sunlight 2 (direct sunlight) is incident on the eyes of the occupant 1 (Step 105). Specifically, it is determined whether or not the sunlight 2 is incident on the target regions 20 (f1 to f4) set to the eyes of the occupant 1. Next, the target region 20 set to the eyes will be described as the target region 20*f*.

For example, it is determined whether or not the sunlight 2 is incident on the target region 20*f*, on the basis of an image captured by the in-vehicle camera. For example, it is determined that the sunlight 2 is incident on the target region 20*f* in the case where the target region 20*f* includes a sufficiently bright region compared with other regions or other cases. Alternatively, in the case where the target region 20*f* has already been shielded or other cases, it is determined whether or not the sunlight 2 is incident on the target region 20*f* on the basis of change in brightness or contrast of the target region 20*f*.

Alternatively, for example, it is determined whether or not the sunlight 2 is incident on the target region 20*f* on the basis of an angle of incidence of the sunlight 2 and a positional relationship between the sunlight 2 and the target region 20*f*. For example, it is determined whether or not the sunlight 2 is incident on the target region 20*f* at a current angle of incidence of the sunlight 2 on the basis of the size and shape of the in-vehicle space 11, positions of the glass windows 12, and the like. In addition, any direction may be used for determining whether the sunlight 2 is incident on the eyes.

In the case where it is determined that the sunlight 2 is incident on the eyes of the occupant 1 (target region 20*f*) (Yes in Step 105), the process of shielding the eyes from light is performed (Step 106). Alternatively, in the case where it is determined that the sunlight 2 is not incident (No in Step 105), the process of shielding the eyes from light is not performed, and the parallel processes for shielding the eyes from light end.

FIG. 11 is a flowchart illustrating an example of the process of shielding eyes from light. In the process of shielding eyes from light, it is decided which glass window 12 will be selected for shielding the eyes (target region 20*f*) from light (Step 301). The glass window 12 for blocking light is appropriately decided depending on a position of the sun 3 and an angle on incidence of sunlight.

As illustrated in FIG. 1, for example, the sunlight 2 incident from a front side of the vehicle 10 in the case where the sun 3 is at a position P1 (in front of the vehicle 10). In this case, the sunlight 2 is incident on the occupant 1 in a front seat or a rear seat via the front windshield 12*a*. Therefore, the light shielding region 4 for shielding the target region 20*f* (f1 to f4) is formed on the front windshield 12*a*.

In addition, the sunlight 2 is incident from a front right side of the vehicle 10 in the case where the sun 3 is at a position P2 (front right side of the vehicle 10). In the example illustrated in FIG. 1, the sunlight 2 is incident on the in-vehicle space 11 via the side glass window 12*c* on the front right side of the vehicle 10. Therefore, the light shielding region 4 for shielding the target regions 20*f* (f1 to f4) from light are formed on the side glass window 12*c*.

In addition, the sunlight 2 is incident from a rear right side of the vehicle 10 in the case where the sun 3 is at a position P3 (rear right side of the vehicle 10). In the example illustrated in FIG. 1, the sunlight 2 is incident on the in-vehicle space 11 via the side glass window 12*e* on the rear right side of the vehicle 10. As described above, in the case where the sunlight 2 is incident from the rear side, sometimes the sunlight 2 is not incident on the eyes of the occupants 1 who are sitting on the front seats (target regions f1 and f2).

On the other hand, there is a possibility that the sunlight 2 is not incident on the eyes of the occupants 1 who are sitting on the rear seats (target regions f3 and f4) in such a manner that the occupant 1 feels dazzled. In such a case, the light shielding region 4 for shielding the eyes of the occupants 1 who are sitting on the rear seats (target regions f3 and f4) is formed on the side glass window 12*e*. Note that, the above-described examples are mere examples. The glass window 12 provided with the light shielding region 4 for blocking light may be appropriately decided depending on an angle of incidence of the sunlight 2, a position of the target region 20*f* related to the eyes, and the like.

For example, it is considered that the sunlight 2 is incident on the occupant 1 sitting on a rear seat via the rear right side glass window 12*e* in the case where the sun 3 is at the position P2. In this case, for example, the front right side glass window 12*c* is decided as the glass window 12 for shielding the eyes of the occupants 1 sitting on the front seats (target regions f1 and f2) from light, and the rear side glass window 12*e* is decided as the glass window 12 for shielding the eyes of the occupants 1 sitting on the rear seats (target regions f3 and f4) from light. For example, the above-described process may be performed.

After the glass window 12 for blocking light is decided, the light shielding pattern 40 is displayed on the decided glass window 12 (Step 302).

For example, the shadow information generation section 36 and the display control section 37 described above with reference to FIG. 2 calculate the position, shape, and size of the light shielding region 4 for shielding the target region 20*f* of eyes from light. The method of calculating the light shielding region 4 is not limited. For example, the position, shape, and size of the light shielding region 4 is calculated appropriately in accordance with a projection model or the like on the assumption that the sunlight 2 is approximately parallel light, in such a manner that a shadow generated by blocking the sunlight 2 is properly cast on the target region 20*f*. Note that, it is possible to use any method as long as it is possible to calculate the light shielding region 4.

In addition, the light shielding pattern 40 is adjusted in conformity with the calculated light shielding region 4. For example, a process or the like of deforming the light shielding pattern 40 in conformity with the size, shape, and the like of the light shielding region 4 is performed. Information on the adjusted light shielding pattern 40 is output to the light shielding unit 13 disposed on the target glass window 12, and the glass window 12 for blocking light displays the light shielding pattern 40.

Note that, in the case of displaying the light shielding pattern 40 (light shielding region 4) on the front windshield 12*a* or the like, the display position of the light shielding pattern 40 may be adjusted as long as the field of view of a driver is assured, for example. For example, an area of prohibiting display of the light shielding pattern 40 or the like is set at a central part of the front windshield 12*a*, and the light shielding pattern 40 is displayed in a range other than that area. This makes it possible to assure a front field of view of the driver, and achieve safe driving.

Figure 12A:
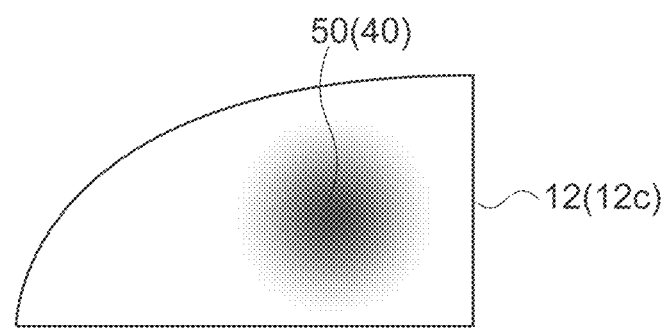
FIGS. 12A, 12B, and 12C are schematic diagrams for describing an example of shielding eyes of an occupant from light.
Figure 12B:
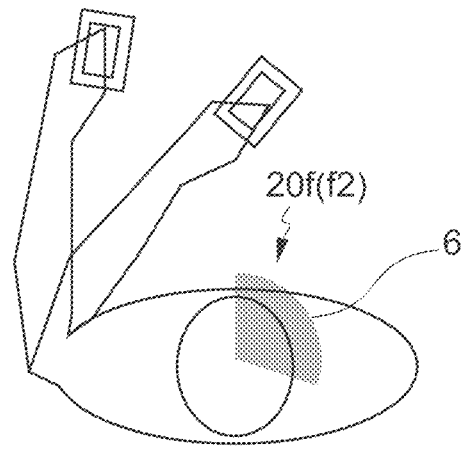
Figure 12C:
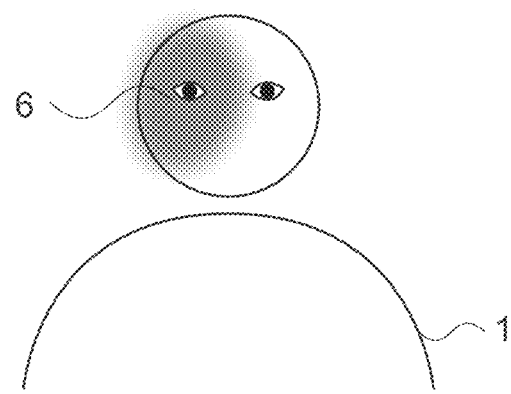

FIGS. 12A, 12B, and 12C are schematic diagrams for describing an example of shielding eyes of the occupant 1 from light. FIGS. 12A, 12B, and 12C schematically illustrate an example of shielding the eyes from light in the case where the sun 3 is at the position P2 (front right side of the vehicle 10. Note that, in the present embodiment, the gradation pattern 50 described with reference to FIGS. 10A 10B, 10C, and 10D is used as the light shielding pattern 40 for shielding eyes from light.

FIG. 12A is a schematic diagram illustrating an example of the gradation pattern 50 displayed on the front right side glass window 12c. The displayed gradation pattern 50 has a position, size, and shape capable of appropriately cast a shadow on the eyes of the occupant 1 (target region 20f).

FIG. 12B is a schematic diagram obtained when the occupant 1 sitting on the font right seat is viewed from above, and FIG. 12C is a schematic diagram obtained when the occupant 1 sitting on the font right seat is viewed from the front side. FIG. 12B and FIG. 12C schematically illustrates a shadow 6 cat on an eye of the occupant 1. As illustrated in FIG. 12B and FIG. 12C, the shadow 6 generated by blocking the sunlight 2 via the gradation pattern 50 is cast on and around the right eye of the occupant 1 (target region 20f). This makes it possible to reduce the sunlight 2 incident on the right eye of the occupant 1 and sufficiently prevent the occupant 1 from being dazzled.

In addition, by using the gradation pattern 50, it is possible to cast the shadow 6 without rough density. This makes it possible to sufficiently prevent the sunlight 2 from directly entering the eye of the occupant 1. In addition, as illustrated in FIG. 12A, the gradation pattern 50 has a blurred outline. Therefore, it is difficult to recognize a boundary between the light shielding region 4 and a region outside the light shielding region 4. This allows the gradation pattern 50 to fit in scenery outside the glass window 12, and it is possible to sufficiently reduce the feeling of strangeness for the occupant 1 viewing the scenery, and it is possible to naturally block the sunlight 2.

Note that, a situation where the sunlight 2 is incident on only the right or left eye of the occupant 1 is considered in the case where the sunlight 2 is incident from only one of the right side or the left side. In such a case the target region 20f is set in conformity with one of the eyes of the occupant 1. This makes it possible to set a small size of the gradation pattern 50, and assure a wide field of view of the occupant 1. For example, the above-described process may be performed.

Returning to FIG. 11, after the light shielding pattern 40 is displayed, transmittance of the light shielding pattern 40 (gradation pattern 50) is adjusted. The transmittance is adjusted on the basis of intensity of the sunlight 2 (direct sunlight), for example. In the present embodiment, a criterion value α is set for the intensity of the sunlight 2. Note that, the intensity of the sunlight 2 is the intensity of the sunlight 2, and is detected by the sunlight intensity detection section 33.

It is determined whether or not the brightness of the sunlight 2 is larger than the criterion value α (Step 303). In the case where the brightness of the sunlight 2 is larger than the criterion value α (Yes in Step 303), the sunlight 2 is considered to be strong, and a process of reducing the transmittance of the light shielding pattern 40 is performed (Step 304). In this case, the light shielding pattern 40 gets darker, and a darker shadow is cast on the eyes of the occupant 1.

In the case where the brightness of the sunlight 2 is the criterion value α or less (No in Step 303), the sunlight 2 is considered to be weak, and a process of increasing the transmittance of the light shielding pattern 40 is performed (Step 305). In this case, transparency of the light shielding pattern 40 increases and the light shielding pattern 40 gets bright, and a lighter shadow is cast on the eyes of the occupant 1. Note that, the transparency does not have to be adjusted in the case where the brightness of the sunlight 2 is identical to the criterion value α.

This makes it possible to set the transmittance of the light shielding pattern 40 depending on the brightness of the sunlight 2, and it is possible to cast a shadow 6 with appropriate brightness. In addition, for example, in the case where the sunlight 2 is dark, it is possible to avoid display of a dark light shielding pattern 40 or the like, and it is possible to reduce the feeling of strangeness for the occupant 1 and naturally block the sunlight 2.

Note that, a method or the like of controlling increase/decrease in the transmittance is not limited. For example, an amount of increase/decrease in the transmittance may be calculated in accordance with a difference between the criterion value α and actual brightness of the sunlight 2 (intensity of sunlight 2). In addition, the present technology is not limited to the case of controlling the transmittance on the basis of the single criterion value α. For example, the transmittance may be controlled by determining whether or not the brightness of the sunlight 2 falls within a predetermined criterion range.

Returning to FIG. 3, in the process of shielding a hand of the occupant 1, it is determined whether or not the sunlight 2 (direct sunlight) is incident on the hand of the occupant 1 (Step 107). Specifically, it is determined whether or not the sunlight 2 is incident on the target regions 20 (h1 to h4) set to the hands of the occupant 1. Next, the target region 20 set to the hands will be described as the target region 20h.

The process of determining whether the sunlight 2 is incident on a hand of the occupant 1 is appropriately performed on the basis of an image of the hand captured by the in-vehicle camera, a positional relationship between the target region 20h and an angle of incidence of the sunlight 2, or the like (see Step 103).

In the case where it is determined that the sunlight 2 is incident on the hand of the occupant 1 (target region 20h) (Yes in Step 107), the process of shielding the hand from light is performed (Step 108). Alternatively, in the case where it is determined that the sunlight 2 is not incident (No in Step 107), the process of shielding the hand from light is not performed, and the parallel processes for shielding the hand from light end.

Figure 13:
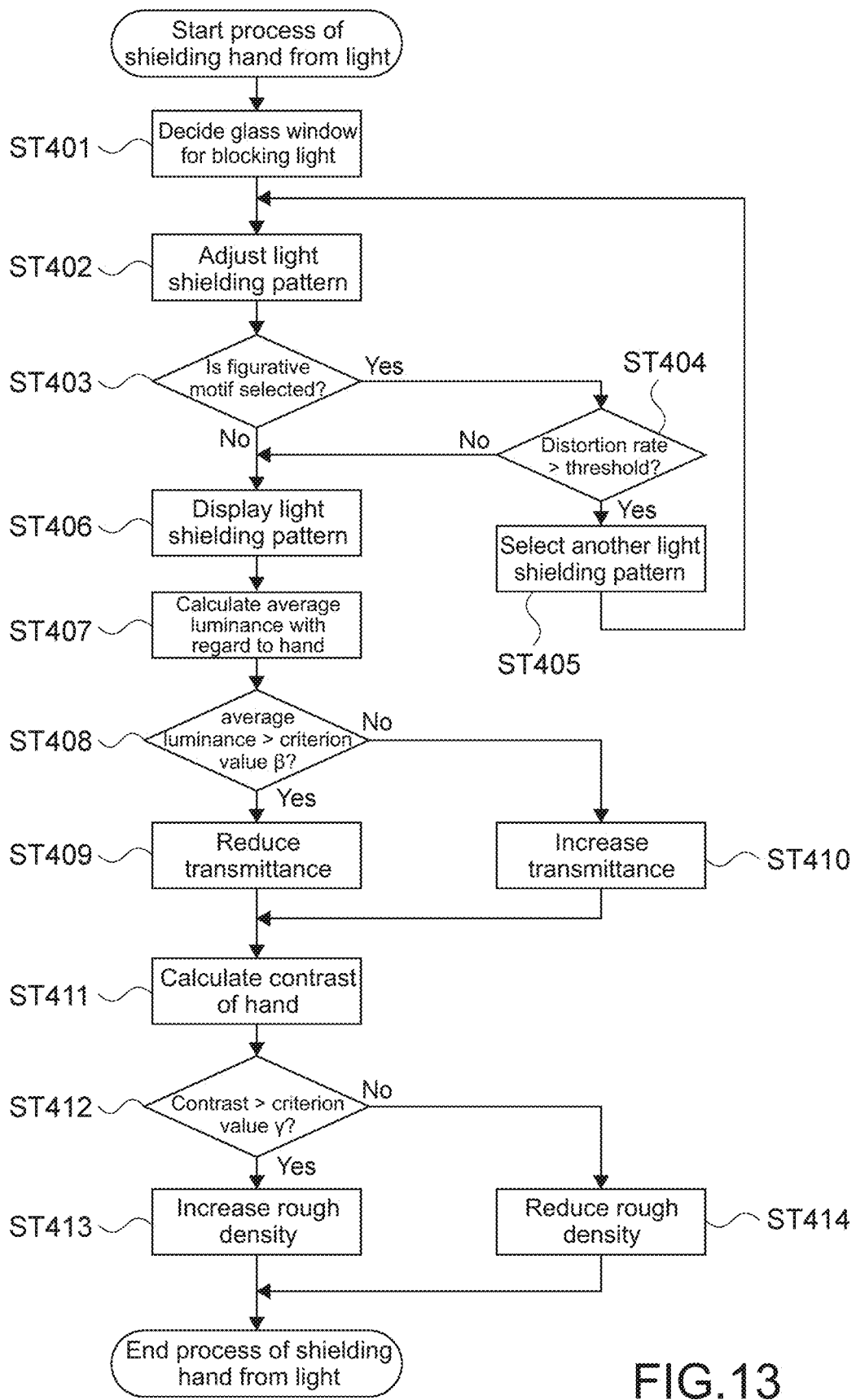
FIG. 13 is a flowchart illustrating an example of a process of shielding a hand from light.

FIG. 13 is a flowchart illustrating an example of the process of shielding a hand from light. In the process of shielding a hand from light, it is decided which glass window 12 will be selected for shielding the hand (target region 20h) from light (Step 401). For example, a glass window 12 for blocking light is decided depending on a position (such as the position p1 to p3) with regard to each of the target regions h1 to h4 set to the hands of each occupant 1. This process is performed in a way similar to the process of deciding a glass window 12 for shielding eyes from light as described above with reference to Step 301 in FIG. 11, for example.

After the glass window 12 for shielding the hands from light is decided, the light shielding pattern 40 to be displayed on the decided glass window 12 is adjusted (Step 402). In the present embodiment, the light shielding pattern 40 selected through the pattern selection process illustrated in FIG. 4 is used as the light shielding pattern 40 for shielding hands from light.

For example, the shadow information generation section 36 and the display control section 37 described above with reference to FIG. 2 calculate the position, shape, and size of the light shielding region 4 for shielding the target region 20h of hands from light. The method of calculating the light shielding region 4 for shielding the hands from light is not limited. After the light shielding region 4 is calculated, the light shielding pattern 40 is adjusted in conformity with the calculated light shielding region 4. For example, a process or the like of deforming the light shielding pattern 40 in conformity with the size, shape, and the like of the light shielding region 4 is performed.

It is determined whether or not the light shielding pattern 40 is a light shielding pattern 40 using a figurative motif (Step 403). For example, it is assumed that the coarse/fine pattern 41c using a figurative motif described with reference to FIGS. 7A 7B, 7C, and 7D (coarse/fine pattern 41c representing the silhouette of cat as a whole) is selected through the pattern selection process. In this case, it is determined that the light shielding pattern 40 using the figurative motif is selected (Yes in Step 403), and it is determined whether or not a distortion rate of the light shielding pattern 40 exceeds a threshold (Step 404).

To shield the target region 20h of hands from light, the shape and size of the light shielding region 4 is constantly updated. Therefore, the shape of the light shielding region 4 is not limited to a fixed shape. The shape of the light shielding region 4 is appropriately deformed depending on an angle of incidence of the sunlight 2 and the like (see FIGS. 14A and 14B). Therefore, the shape of the light shielding pattern 40 tailored to the light shielding region 4 is also deformed.

For example, in the case where the coarse/fine pattern 41c that is the silhouette of cat is adjusted in conformity with the light shielding region 4, sometimes distortion in a graphic on a surface of a window may become conspicuous. In other words, there is a possibility that the silhouette of the cat is deformed in such a manner that the silhouette extends vertically, horizontally, or the like. The degree of distortion (distortion rate) is calculated, and it is determined whether or not the degree of distortion (distortion rate) is larger than a predetermined threshold. Note that, the method of calculating the distortion rate is not limited. For example, the distortion rate may be appropriately calculated by using an aspect ratio of the silhouette.

For example, in the case where it is determined that the distortion rate exceeds the predetermined threshold (Yes in Step 404), another light shielding pattern 40 that is different from the coarse/fine pattern 41c using the figurative motif is selected (Step 405). For example, a default light shielding pattern 40 (such as the coarse/fine pattern 41a using the geometric form) is selected as an alternative light shielding pattern 40. When the other light shielding pattern 40 is selected, the process returns to Step 402, and the other light shielding pattern 40 is adjusted in conformity with the light shielding region 4.

For example, in the case where it is determined that the distortion rate exceeds the predetermined threshold (No in Step 404), the light shielding pattern 40 is displayed (Step 406) in a way similar to the case where the figurative motif is not selected (No in Step 403). For example, information on the adjusted light shielding pattern 40 is output to the light shielding unit 13 disposed on the target glass window 12, and the glass window 12 for blocking light displays the light shielding pattern 40.

As described above, in the present embodiment, the light shielding pattern 40 is set depending on the shape of the light shielding region 4. This makes it possible to avoid display of a distorted silhouette or the like on the glass window 12, and it is possible to display the light shielding pattern 40 without the feeling of strangeness. Note that, the method or the like of determining distortion in the light shielding pattern 40 is not limited. For example, after actually displaying a light shielding pattern 40, it is possible to capture an image of the light shielding pattern 40 on a glass window or a shadow thereof, and determine a distortion rate on the basis of the captured image or the like. In addition, any method of determining distortion of the light shielding pattern 40 may be used.

FIGS. 14A and 14B are schematic diagrams for describing an example of shielding hands of the occupant 1 from light. FIGS. 14A and 14B schematically illustrate an example of shielding hands from light in the case where the sun 3 is at the position P2 (front right side of the vehicle 10). In this case, for example, the light shielding pattern 40 is displayed on the front right side glass window 12c. In addition, the shadow of the light shielding pattern 40 displayed on the side glass window 12c is cast on a hand (target region h2) of the occupant 1 sitting on the front right seat.

Left diagrams in FIGS. 14A and 14B are schematic diagrams illustrating light shielding patterns 40 displayed on the side glass window 12c. In addition, right diagrams in FIGS. 14A and 14B are schematic diagrams illustrating shadows 6 cast on the hand (target region h2) of the occupant 2 sitting on the front right seat. Note that, FIG. 14A and FIG. 14B are different from each other in transmittance and rough density of the light shielding pattern 40.

With reference to FIGS. 14A and 14B, the coarse/fine pattern 41b using the group motif is displayed. In the coarse/fine pattern 41b, the plurality of criterion patterns 42b having the leaf motif is disposed (see FIGS. 6A, 6B, 6C, and 6D). For example, as illustrated in the left diagram in FIG. 14A, the coarse/fine patterns 41b is appropriately displayed in such a manner that the sunlight 2 is blocked depending on the shape and size of the target region h2 set to the hand of the occupant 1.

This makes it possible to cast the shadow 6 of the coarse/fine pattern 41b on the hand of the occupant 1 as illustrated in the right diagram in FIG. 14A. Therefore, for example, it is possible to prevent the sunlight 2 from being incident on the mobile terminal 5 used by the occupant 1, and this allows the occupant 1 to appropriately view information displayed on the mobile terminal 5. In addition, it is possible to sufficiently prevent the occupant 1 from being dazzled by the sunlight 2 or the like reflected by the mobile terminal 5 and incident on the eyes of the occupant 1.

In addition, as described above, the coarse/fine pattern 41b is selected through the pattern selection process. In the case where the coarse/fine pattern 41b having the lead motif is selected, there is a high possibility that the vehicle 10 is traveling in an area richly endowed with nature such as the mountain forest district, for example. In other words, the coarse/fine pattern 41b has a motif related to scenery viewed from the in-vehicle space 11.

This makes it possible to display the light shielding pattern 40 (light shielding region 4) having the form related to the scenery for the occupant 1 viewing the outside of the glass window 12. As a result, the feeling of strangeness or the like caused by the displayed light shielding pattern 40 is drastically reduced, and it is possible to naturally shield the hand of the occupant 1 from light without disturbing the occupant 1 in a state of enjoying viewing the outside scenery.

Returning to FIG. 13, after the light shielding pattern 40 for hand is displayed, average luminance is calculated with regard to the hand of the occupant 1 (Step 407). Specifically, the in-vehicle information analysis section 31 calculates the average luminance of the target region 20h from an image of the target region 20h of the hand of the occupant 1 captured by the in-vehicle camera or the like. In other words, it can be said that the average luminance of the shadow of the light shielding pattern 40 cat on the target region 20h is calculated. The method of calculating the average luminance is not limited.

It is determined whether or not the average luminance of the target region 20h is larger than a predetermined criterion value β (Step 408). The criterion value β is appropriately set in such a manner that the shadow 6 cast on the hand through the light shielding pattern 40 has appropriate brightness.

In the case where the average luminance of the target region 20h is larger than the criterion value β (Yes in Step 408), a process of reducing the transmittance of the light shielding pattern 40 (light shielding region 4) is performed (Step 409). In other words, the transmittance of the light shielding pattern 40 is reduced in the case where the shadow 6 cast on the hand through is brighter than the criterion value β.

In FIG. 14A, the transmittance of the light shielding pattern 40 is set to 40%. As illustrated in the right diagram in FIG. 14A, the shadow 6 cast on the hand has brightness depending on the transmittance of the light shielding pattern 40. In the case where the brightness (average luminance) of the shadow 6 is higher than the criterion value β, the transmittance of the light shielding pattern 40 is set to a value less than FIG. 14A (such as 20%) as illustrated in FIG. 14B. As a result, the brightness of the shadow 6 of the hand is reduced and a darker shadow 6 is formed.

Alternatively, in the case where the average luminance of the target region 20h is less than the criterion value β (No in Step 408), a process of increasing the transmittance of the light shielding pattern 40 (light shielding region 4) is performed (Step 410). This makes it possible to increase brightness of the shadow 6 of the hand and form a brighter shadow 6.

Note that, a method or the like of controlling increase/decrease in the transmittance is not limited. For example, an amount of increase/decrease in the transmittance may be calculated in accordance with a difference between the criterion value β and the average luminance. In addition, the present technology is not limited to the case of controlling the transmittance on the basis of the single criterion value β. For example, the transmittance may be controlled by determining whether or not the average luminance falls within a predetermined criterion range.

As described above, in the present embodiment, the transmittance of the light shielding region 4 for the sunlight 2 is calculated on the basis of the brightness of the target region 20h. This makes it possible to cast the shadow 6 with appropriate brightness on the hand of the occupant 1. In addition, it is possible to avoid formation of unnecessarily dark light shielding region 4 (with low transmittance) on the glass window 12.

After the transmittance of the light shielding pattern 40 is adjusted, the contrast of the hand of the occupant 1 is calculated (Step 411). Specifically, the in-vehicle information analysis section 31 calculates the contrast of the target region 20h from the image of the target region 20h of the hand of the occupant 1 captured by the in-vehicle camera or the like. In other words, it can be said that the contrast (light and dark) of the shadow 6 of the light shielding pattern 40 cast on the target region 20h is calculated.

For example, in the case of using the coarse/fine pattern 41, the cast shadow 6 includes a bright portion (hereinafter, referred to as irradiated spot 25) and a dark portion. On the bright portion, the sunlight 2 that has passed through the transparent region 43 is incident as it is. On the dark portion, the shadow 6 of the light shielding blocks 44 for blocking the sunlight 2 is cast. The contrast (light and dark) of the hand of the occupant 1 is calculated on the basis of a luminance difference or the like between the bright portion and the dark portion.

Note that, the shadow 6 of the coarse/fine pattern 41 may have a clear outline or a blurred outline depending on intensity and a degree of diffusion of the sunlight 2. Therefore, by using the captured image of the shadow 6, it is possible to appropriately calculate the contrast of the shadow 6 that is actually cast.

It is determined whether or not the contrast of the target region 20h is larger than a predetermined criterion value γ (Step 412). The criterion value γ is appropriately set in such a manner that the shadow 6 cast on the hand through the light shielding pattern 40 has appropriate contrast, for example.

In the case where the contrast of the target region 20h is larger than the criterion value γ (Yes in Step 412), a process of increasing the rough density of the light shielding pattern 40 (light shielding region 4) is performed (Step 413). In other words, the rough density of the light shielding pattern (coarse/fine pattern 41) is increased in the case where the contrast of the shadow 6 cast on the hand is bright and a difference between light and dark is larger than the criterion value R.

For example, in FIG. 14A, the coarse/fine pattern 41b of the light shielding pattern 40 is set to 40%. As illustrated in the right diagram in FIG. 14A, the shadow 6 cast on the hand includes a bright portion (irradiated spot) at a rate depending on the rough density of the coarse/fine pattern 41b.

In the case where the contrast of the shadow 6 is higher than the criterion value γ, the rough density of the coarse/fine pattern 41b is set to a value higher than FIG. 14A (such as 80%) as illustrated in FIG. 14B. As a result, the rate of the light shielding blocks 44 for blocking the sunlight 2 increases, and it is possible to generate a denser shadow 6 with fewer bright irradiated spots.

Alternatively, in the case where the contrast of the target region 20h is less than the criterion value γ (No in Step 412), a process of reducing the rough density of the light shielding pattern 40 (light shielding region 4) is performed (Step 414). This makes it possible to reduce the rate of the light shielding blocks 44 (such as criterion patterns 42b) for blocking the sunlight 2, increase the bright portion in the shadow 6 of the hand, and form a brighter shadow 6 as a whole.

Note that, a method or the like of controlling increase/decrease in the rough density is not limited. For example, an amount of increase/decrease in the rough density may be calculated in accordance with a difference between the criterion value γ and the contrast. Alternatively, in the case where staged rough density is set or other cases, a process or the like of appropriately setting stages of the rough density may be performed. In addition, the present technology is not limited to the case of controlling the rough density on the basis of the single criterion value γ. For example, the rough density may be controlled by determining whether or not the contrast falls within a predetermined criterion range.

As described above, in the present embodiment, the rate (rough density) of the light shielding blocks 44 in the light shielding region 4 is set on the basis of the contrast of the target region 20h. This makes it possible to appropriately control an amount of light leaked from the coarse/fine pattern 41. For example, it is possible to naturally block the sunlight 2 without disturbing work or the like performed by the occupant 1. In addition, it is possible to avoid formation of unnecessarily dense light shielding region 4 (with high rough density) on the glass window 12.

FIG. 15 is a schematic diagram illustrating an example of the irradiated spot on the mobile terminal 5. FIG. 15 schematically illustrates the mobile terminal 5 (smartphone or the like) used by the occupant 1 in the shadow 6 cast through the coarse/fine pattern 41. In the case of using the coarse/fine pattern 41, sometimes the sunlight 2 may penetrate the intervals (transparent region 43) in the coarse/fine pattern 41 and may be incident on the mobile terminal 5 as it is. In this case, an irradiated spot 25 is formed on the mobile terminal 5 by the sunlight 2.

In the present embodiment, the rate (rough density) of the light shielding blocks in the light shielding region 4 is set on the basis of the size of the irradiated spot 25 in the target region 20h irradiated with the sunlight 2 penetrated into the intervals.

For example, the size of the irradiated spot 25 is compared with the size of the display area 26 of the mobile terminal 5. At this time, a process of increasing the rough density of the coarse/fine pattern 41 is performed in the case where the size of the irradiated spot 25 is relatively larger than the display area 26 (in the case where the size of the irradiated spot 25 is larger than the display area 26 by more than 10% or other cases).

The method of calculating the size of the irradiated spot 25 is not limited. For example, the in-vehicle information analysis section 31 calculates an average size or the like of the irradiated spots 25 on the basis of an image of the target region 20h of the hand. Alternatively, the mobile terminal 5 is tracked, and a size of a brighter spot (irradiated spot 25) than the other portion on the mobile terminal 5 is calculated.

For example, in the case where the irradiated spot 25 has a sufficiently large size or other cases, sometimes it is difficult to view information displayed on the display area 26 on the mobile terminal 5. In the present embodiment, the rough density of the coarse/fine pattern 41 is adjusted in conformity with the size of the irradiated spot 25. This makes it possible to appropriately adjust the size of the irradiated spot 25. As a result, it is possible for the occupant 1 to properly read the information displayed on the display area 26 even in the shadow 6 cast through the coarse/fine pattern 41, and it is possible to block the sunlight 2 without disturbing work performed by the occupant 1.

Note that, the process described with reference to FIG. 15 is appropriately performed in addition to the process of adjusting the rough density (such as Step 411 to Step 414) in the process of shielding the hand from light illustrated in FIG. 13, for example. In addition, the process of adjusting the rough density if the coarse/fine pattern 41 is not limited. The rough density may be appropriately adjusted in conformity with a state of the sunlight 2, a state of the cast shadow 6, content of the work performed by the occupant 1, and the like.

Figure 16A:
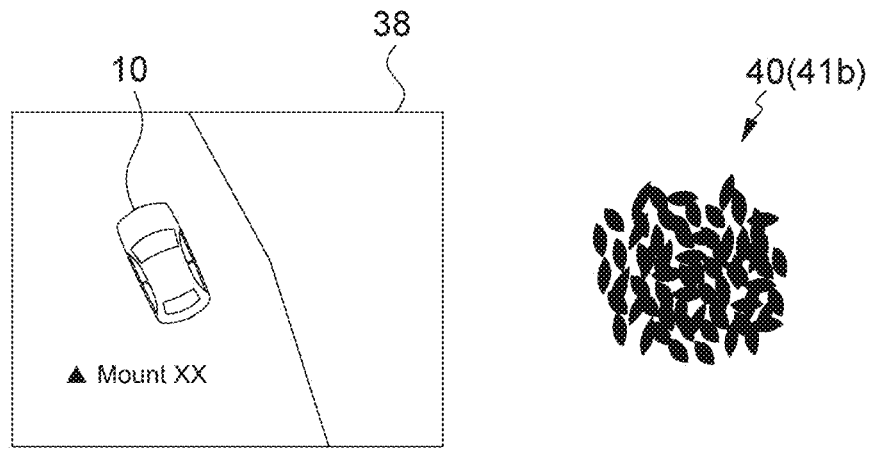
FIGS. 16A, 16B, and 16C are schematic diagrams illustrating examples of light shielding patterns selected depending on external environments around a vehicle.
Figure 16B:
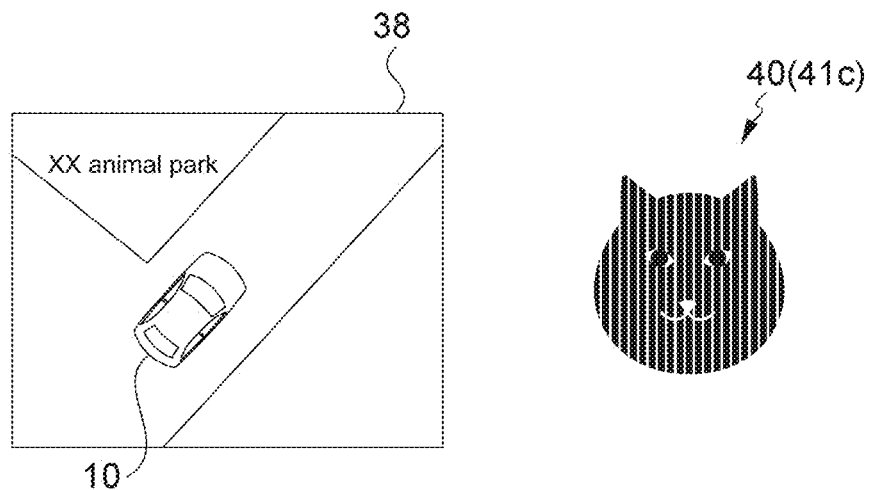
Figure 16C:
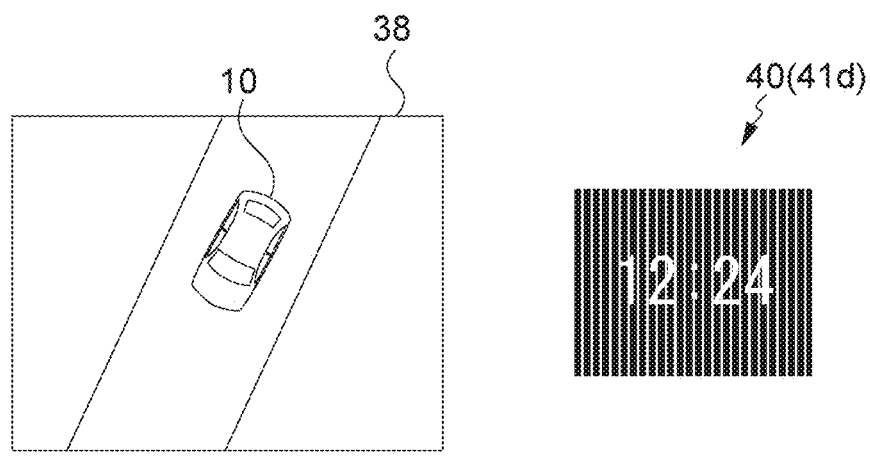

FIGS. 16A, 16B, and 16C are schematic diagrams illustrating examples of the light shielding patterns 40 selected depending on external environments around the vehicle 10. FIGS. 16A, 16B, and 16C illustrate examples of the map data 28 around the vehicle 10 and the displayed light shielding pattern 40.

In FIG. 16A, the vehicle 10 travels in the mountain forest district. For example, in the case where there is "Mount XX" near the vehicle 10, character strings in the map data 38 are searched, and a keyword related to scenery such as "mountain" is extracted. In this case, in the pattern selection process, the coarse/fine pattern 41b illustrated in FIGS. 6A, 6B, 6C, and 6D are selected as the light shielding pattern 40 provided with the tag "mountain" or a tag belonging to a category similar to "mountain", for example. This makes it possible to display the light shielding pattern 40 (coarse/fine pattern 41b) having a form related to the scenery such as a mountain, woods, or the like near the vehicle 10.

In FIG. 16B, the vehicle 10 travels near "XX animal park". In this case, text information such as "animal" is extracted from the map data as the keyword related to the scenery. Next, a light shielding pattern 40 such as a coarse/fine pattern 41c provided with the tag "animal" or a tag belonging to a category similar to "animal" is selected. This makes it possible to display the light shielding pattern 40 (for example, coarse/fine pattern 41c illustrated in FIGS. 7A, 7B, 7C, and 7D) having a form associated with the animal park, on the glass window 12.

As described above, in the present embodiment, the light shielding pattern 40 related to the scenery viewed from the in-vehicle space 11 is displayed. This makes it possible to provide a light shielding region to the occupant 1 who is operating a smartphone or the like in such a manner that the occupant 1 is not dazzled by reflection at a screen or the like. In addition, it is possible to form a natural light shielding pattern 40 (light shielding region 4) in the field of view of the occupant 1 who is viewing the outside scenery.

In FIG. 16C, the keyword related to the scenery is not retrieved. In this case, the coarse/fine pattern 41d or the like for displaying information on current time or the like is selected, and the current time is displayed on the glass window 12, for example. This allows the occupant 1 to view the time displayed on the glass window 12 by using brightness and darkness. As described above, the form of the light shielding pattern 40 may be appropriately selected regardless of the external environment.

For example, in the case where the vehicle 10 approaches its destination, the light shielding pattern 40 may be controlled in such a manner that information on predicted arrival time, planned driving time, or the like is displayed. This makes it possible to naturally tell the occupant 1 that the vehicle 10 is approaching the destination.

Note that, various kinds of keywords may be registered in advance with regard to the map data 38. This makes it possible to display any light shielding pattern 40 at a desired place. For example, it is possible to provide various kinds of information related to an ambient area by using the light shielding pattern 40. As a result, it is possible to achieve an excellent amusement function while properly shielding the eyes or hands of the occupant 1 from light.

As described above, the controller according to the present embodiment calculates the light shielding region 4 for shielding the target regions 20 inside the glass windows 12 from light by blocking the sunlight 2 incident on the glass window 12 of the vehicle 10. The information on the target regions 20 and the information on the external environment including the information on the sunlight 2 are used for calculating the light shielding region 4. For example, this makes it possible to calculate the light shielding region 4 tailored to the external environment outside the vehicle 10 and naturally block the outside light.

Other Embodiments

The present technology is not limited to the above-described embodiment. Various other embodiments are possible.

The cases of blocking the sunlight have been described above as examples. The present technology is not limited thereto. A process of blocking other kinds of outside light incident on the vehicle may also be performed. For example, in the case of night driving, sometimes light from an oncoming vehicle is incident from a front side of a vehicle. Alternatively, there is a possibility that the occupant is dazzled by light that comes from a rear side of the vehicle and that is reflected by a rear-view mirror or the like.

In such a case, a light shielding pattern (light shielding region) may be calculated in such a manner that light from another vehicle or the like is treated as the outside light and the outside light is blocked. For example, an incident direction of the light from the other vehicle is detected by using the outside-vehicle camera, the distance sensor, or the like. The light shielding pattern is appropriately generated on the basis of the incident direction in such a manner that the eyes or hands of the occupant, the rear-view mirror, or the like serving as the target region is shielded from light. For example, the above-described process may be performed.

Application Examples

The technology according to the disclosure can be applied to various products. For example, the technology according to the present disclosure may be realized as an apparatus installed in any kind of mobile object such as vehicles, an electric vehicles, hybrid electric vehicles, motorcycles, bicycles, personal transporters, airplanes, drones, ships, robots, heavy equipment, agricultural machinery (tractors), and the like, for example.

Figure 17:
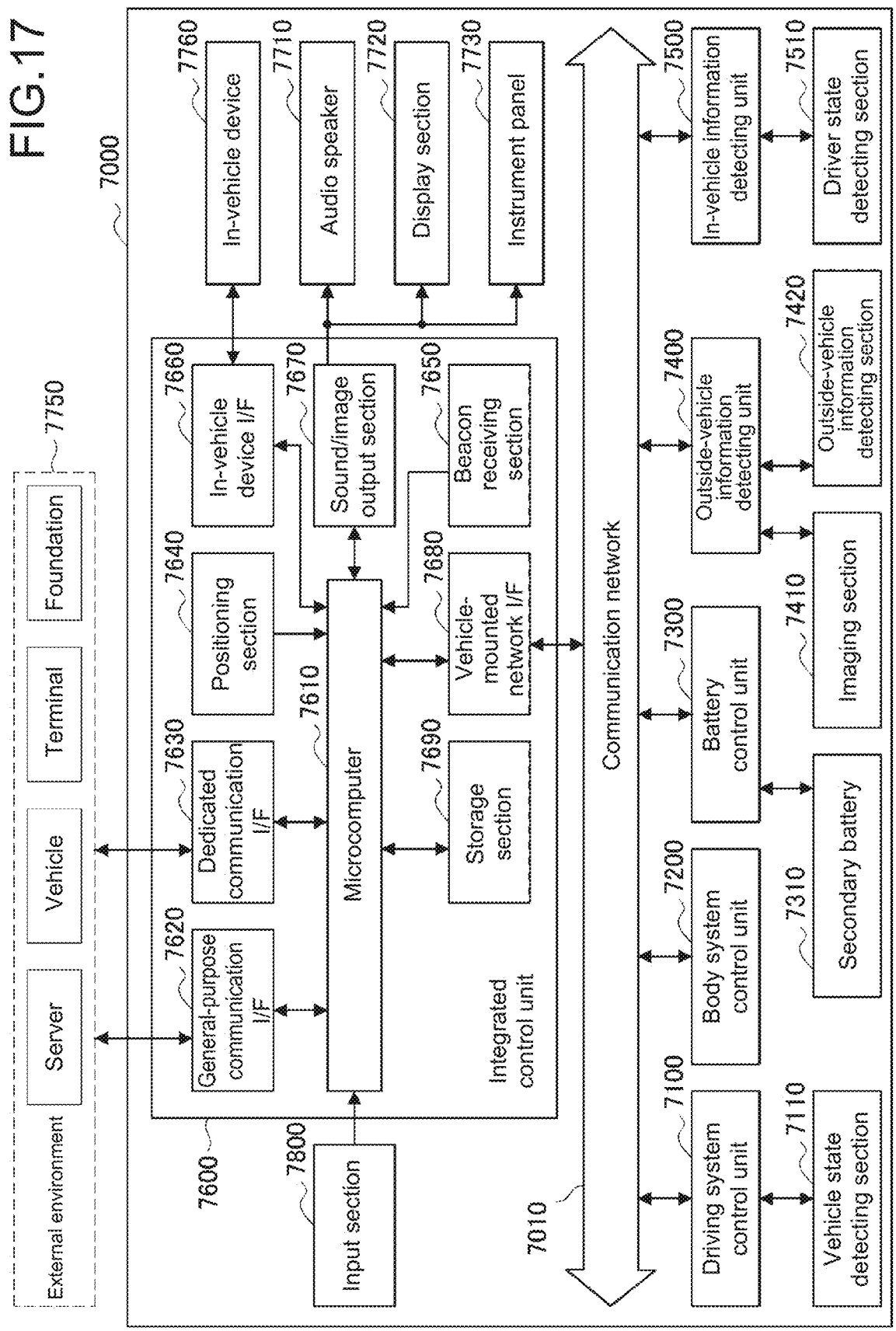
FIG. 17 is a block diagram illustrating an example of schematic configuration of a vehicle control system.

FIG. 17 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 17, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 17 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices is integrated.

Figure 18:
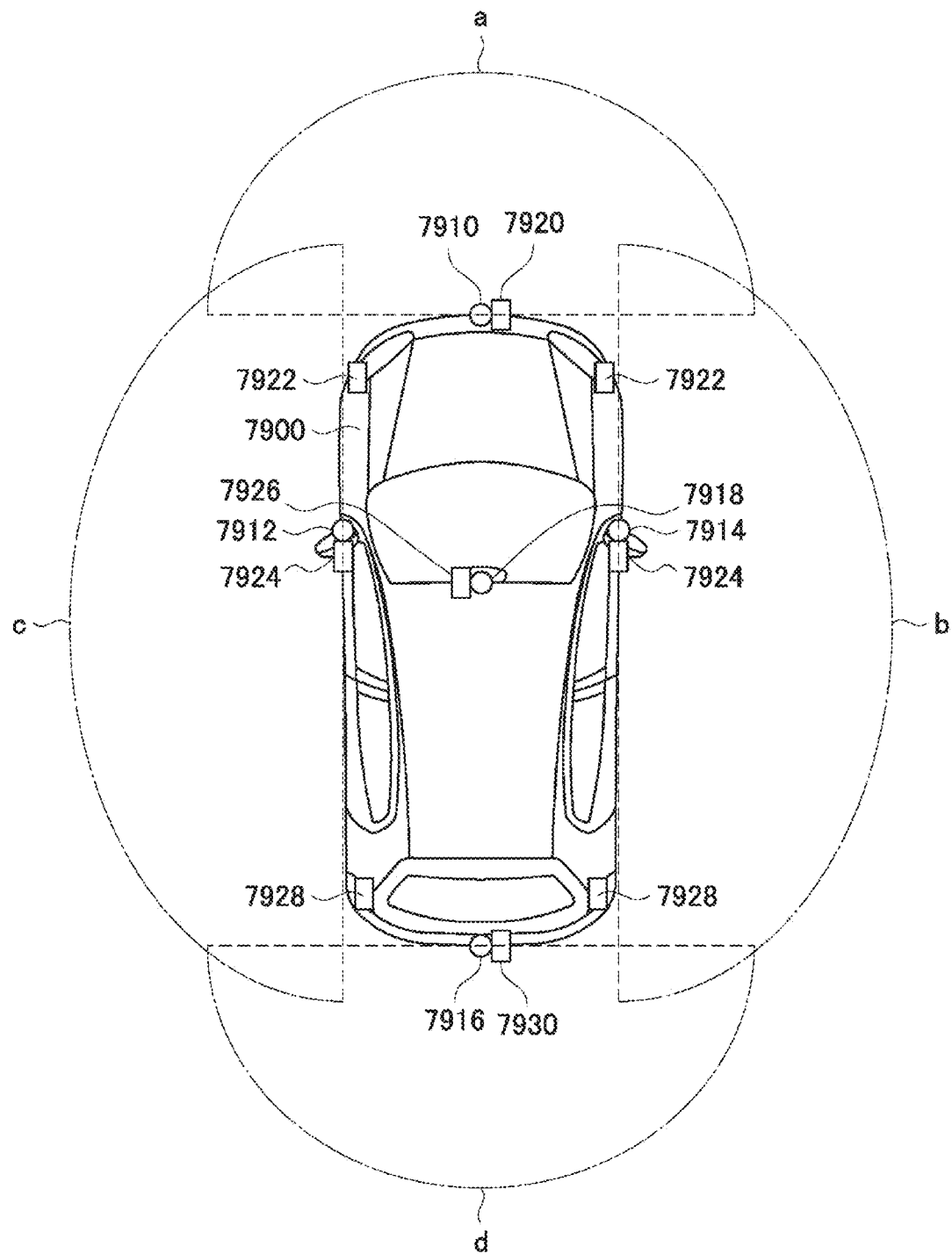
FIG. 18 is an explanatory diagram illustrating an example of installation positions of an outside-vehicle information detecting section and an imaging section.

FIG. 18 depicts an example of installation positions of the imaging section 7410 and the outside-vehicle information detecting section 7420. Imaging sections 7910, 7912, 7914, 7916, and 7918 are, for example, disposed at at least one of positions on a front nose, side view mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the side view mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 18 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the side view mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 17, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of a passenger sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), WiMAX (registered trademark), long term evolution (LTE) (registered trademark), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 17, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 17 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

It should be noted that a computer program for realizing the respective functions of the controller 30 according to the present embodiment described with reference to FIG. 2 can be mounted on any of the control units or the like. Further, it is also possible to provide a computer readable recording medium that stores such a computer program. The recording medium is, for example, a magnetic disk, an optical disc, a magneto-optical disc, a flash memory, or the like. Further, the computer program described above may be distributed via, for example, a network without using the recording medium.

The controller 30 according to the present embodiment described with reference to FIG. 2 is applicable to the integrated control unit 7600 according to the application example illustrated in FIG. 17, in the above-described vehicle control system 7000. For example, the respective functional blocks of the incident angle calculation section 32, the sunlight intensity detection section 33, the scenery prediction section 34, the display information generation section 35, the shadow intensity generation section 36, and the display control section 37 of the controller 30 are implemented by the microcomputer 7610 of the integrated control unit 7600. In addition, the in-vehicle information analysis section 31 of the controller 30 corresponds to the in-vehicle information detection unit 7500 of the vehicle control system 7000. In addition, the in-vehicle sensor 14 illustrated in FIG. 2 is configured by using a camera or the like for capturing an image of a vehicle interior. The camera or the like is included in the driver state detection unit 7510, for example. The outside-vehicle sensor 15 corresponds to the outside-vehicle information detection section 7420. The vehicle sensor 16 is configured by various kinds of sensors included in the vehicle state detecting section 7110. In addition, the navigation device 17 is installed in the vehicle as the in-vehicle device 7760, for example.

In addition, the light shielding units 13 disposed on the respective glass windows are installed as the in-vehicle device together with the driving units for driving the light shielding units 13. Therefore, the light shielding units 13 and their driving units are connected to the in-vehicle device I/F 7660 of the integrated control unit 7600 and are controlled by the microcomputer 7610, for example.

For example, the integrated control unit 7600 and the in-vehicle information detection unit 7500 generate the information on the external environment including outside light and the information on the target region serving as the light shielding target. The light shielding region is calculated on the basis of such information. This makes it possible to naturally block the outside light by using the light shielding unit 13 disposed on the glass window.

In addition, at least one of the structural elements of the controller 30 described with reference to FIG. 2 may be implemented by a module for the integrated control unit 7600 illustrated in FIG. 17 (e.g., integrated circuit module constituted of one die). Alternatively, the controller 30 described with reference to FIG. 2 may be implemented by the plurality of control units of the vehicle control system 7000 illustrated in FIG. 17.

Out of the feature parts according to the present technology described above, at least two feature parts can be combined. That is, the various feature parts described in the embodiments may be arbitrarily combined irrespective of the embodiments. Further, various effects described above are merely examples and are not limited, and other effects may be exerted.

Note that, the present technology may also be configured as below.

(1) An information processing device, including:

an acquisition section that acquires information on a target region inside a glass window of a mobile object, and information on an external environment outside the mobile object, the information on the external environment including information on outside light incident on the glass window; and a calculation section that calculates a light shielding region for shielding the target region from light by blocking the outside light on the glass window, on the basis of the acquired information on the target region and the acquired information on the external environment.

(2) The information processing device according to (1), in which
- the information on the outside light includes information on an incident direction of the outside light relative to the mobile object,
- the information on the target region includes information on a position of the target region, and
- the calculation section calculates a position of the light shielding region on the glass window on the basis of the incident direction of the outside light and the position of the target region.

(3) The information processing device according to (2), in which
- the information on the target region includes information on at least one of shape or size of the target region, and
- the calculation section calculates at least one of shape or size of the light shielding region on the basis of at least one of the incident direction of the outside light and the shape or size of the target region.

(4) The information processing device according to any one of (1) to (3), in which
- the information on the target region includes information on brightness in the target region, and
- the calculation section calculates transmittance of the light shielding region to the outside light on the basis of the brightness in the target region.

(5) The information processing device according to any one of (1) to (4), in which
- the target region is set around an occupant who is in a space inside the glass window of the mobile object.

(6) The information processing device according to (5), in which
- the target region is set to at least one of an eye of the occupant, a hand of the occupant, or a terminal device used by the occupant.

(7) The information processing device according to (5) or (6), in which
- the target region is fixedly set near the occupant.

(8) The information processing device according to any one of (1) to (7), in which
- the information on the external environment includes scenery information regarding scenery around the mobile object, and
- the calculation section sets a light shielding pattern of the light shielding region on the basis of the scenery information.

(9) The information processing device according to (8), in which
- the calculation section selects a light shielding pattern with a tag related to the scenery information from among a plurality of the light shielding patterns with tags related to scenery.

(10) The information processing device according to (8) or (9), in which
- the light shielding patterns include a relevant pattern which is related to the scenery.

(11) The information processing device according to (10), in which
- the light shielding patterns include a group pattern formed of a plurality of the relevant patterns.

(12) The information processing device according to any one of (8) to (11), in which
- the light shielding patterns include at least one of a coarse/fine pattern whose transmittance changes discontinuously in the light shielding region, or a gradation pattern whose transmittance changes continuously in the light shielding region.

(13) The information processing device according to (12), in which
- the coarse/fine pattern includes light shielding blocks that are disposed at intervals in the light shielding region and block the outside light.

(14) The information processing device according to (13), in which
- the information on the target region includes information on contrast of the target region, and
- the calculation section sets a rate of the light shielding blocks in the light shielding region on the basis of the contrast of the target region.

(15) The information processing device according to (13) or (14), in which
- the calculation section sets a rate of the light shielding blocks in the light shielding region on the basis of size of an irradiated spot in the target region, the irradiated spot being irradiated with the outside light that has passed through the intervals.

(16) The information processing device according to any one of (8) to (15), in which
- the calculation section sets the light shielding pattern depending on shape of the light shielding region.

(17) The information processing device according to any one of (1) to (16), in which
- the calculation section calculates the light shielding region in such a manner that the light shielding region includes predetermined display information.

(18) An information processing method that causes a computer system to:
- acquire information on a target region inside a glass window of a mobile object, and information on an external environment outside the mobile object, the information on the external environment including information on outside light incident on the glass window; and
- calculate a light shielding region for shielding the target region from light by blocking the outside light on the glass window, on the basis of the acquired information on the target region and the acquired information on the external environment.

(19) A program that causes a computer system to perform:
- a step of acquiring information on a target region inside a glass window of a mobile object, and information on an external environment outside the mobile object, the information on the external environment including information on outside light incident on the glass window; and
- a step of calculating a light shielding region for shielding the target region from light by blocking the outside light on the glass window, on the basis of the acquired information on the target region and the acquired information on the external environment.

(20) A mobile object, including:
- a glass window that divides at least a portion of an interior space from an outside of the mobile object;
- an acquisition section that acquires information on a target region in the interior space, and information on an external environment outside the mobile object, the information on the external environment including information on outside light incident on the glass window;
- a calculation section that calculates a light shielding region for shielding the target region from light by blocking the outside light on the glass window, on the basis of the acquired information on the target region and the acquired information on the external environment; and a light shielding unit that is disposed on the glass window to generate the calculated light shielding region.

REFERENCE SIGNS LIST 1 occupant
2 sunlight
4 light shielding region
10 vehicle
11 in-vehicle space
12 glass window
13 light shielding unit
20, 20f, 20h, f1 to f4, h1 to h4 target region
30 controller
31 in-vehicle information analysis section
32 incident angle calculation section
33 sunlight intensity detection section
34 scenery prediction section
36 shadow information generation section
37 display control section
40 light shielding pattern
41, 41a to 41d coarse/fine pattern
44 light shielding block
50 gradation pattern
100 light shielding control system

The invention claimed is:

1. An information processing device, comprising:
an acquisition section configured to acquire information on a target region inside a glass window of a mobile object, and information on an external environment outside the mobile object, wherein the information on the external environment includes information on outside light incident on the glass window, and scenery information regarding scenery around the mobile object; and
a calculation section configured to:
calculate, based on the acquired information on the target region and the acquired information on the external environment, a light shielding region that blocks the outside light on the glass window to shield the target region; and
set a light shielding pattern of the light shielding region based on the scenery information.

2. The information processing device according to claim 1, wherein
the information on the outside light includes information on an incident direction of the outside light relative to the mobile object,
the information on the target region includes information on a position of the target region, and
the calculation section is further configured to calculate a position of the light shielding region on the glass window based on the incident direction of the outside light and the position of the target region.

3. The information processing device according to claim 2, wherein
the information on the target region includes information on at least one of a shape of the target region or a size of the target region, and
the calculation section is further configured to calculate at least one of a shape of the light shielding region or a size of the light shielding region based on at least one of the incident direction of the outside light and the one of the shape of the target region or size of the target region.

4. The information processing device according to claim 1, wherein
the information on the target region includes information on brightness in the target region, and
the calculation section is further configured to calculate transmittance of the light shielding region to the outside light based on the brightness in the target region.

5. The information processing device according to claim 1, wherein the target region is around an occupant who is in a space inside the glass window of the mobile object.

6. The information processing device according to claim 5, wherein the target region is at least one of an eye of the occupant, a hand of the occupant, or a terminal device associated with the occupant.

7. The information processing device according to claim 5, wherein the target region is within a vicinity of the occupant.

8. The information processing device according to claim 7, wherein the calculation section is further configured to select the light shielding pattern with a tag related to the scenery information from among a plurality of light shielding patterns with tags related to the scenery.

9. The information processing device according to claim 8, wherein the plurality of light shielding patterns includes at least one of a coarse/fine pattern whose transmittance changes discontinuously in the light shielding region, or a gradation pattern whose transmittance changes continuously in the light shielding region.

10. The information processing device according to claim 9, wherein
the coarse/fine pattern includes light shielding blocks that are disposed at intervals in the light shielding region, and
the light shielding blocks block the outside light.

11. The information processing device according to claim 10, wherein
the information on the target region includes information on contrast of the target region, and
the calculation section is further configured to set a rate of the light shielding blocks in the light shielding region based on the contrast of the target region.

12. The information processing device according to claim 10, wherein
the calculation section is further configured to set a rate of the light shielding blocks in the light shielding region based on a size of an irradiated spot in the target region, and
the irradiated spot is irradiated with the outside light that has passed through the intervals.

13. The information processing device according to claim 7, wherein the calculation section is further configured to set the light shielding pattern based on a shape of the light shielding region.

14. The information processing device according to claim 1, wherein the light shielding pattern includes a relevant pattern which is related to the scenery.

15. The information processing device according to claim 14, wherein
the light shielding pattern includes a group pattern of a plurality of relevant patterns, and
the plurality of relevant patterns includes the relevant pattern.

16. The information processing device according to claim 1, wherein the calculation section is further configured to calculate the light shielding region that includes specific display information.

17. An information processing method, comprising:
acquiring information on a target region inside a glass window of a mobile object, and information on an external environment outside the mobile object, wherein the information on the external environment includes information on outside light incident on the glass window, and scenery information regarding scenery around the mobile object;
calculating, based on the acquired information on the target region and the acquired information on the external environment, a light shielding region for shielding the target region from light by blocking the outside light on the glass window; and,
setting a light shielding pattern of the light shielding region based on the scenery information.

18. A non-transitory computer-readable medium having stored thereon, computer-executable instructions which, when executed by a computer, cause the computer to execute operations, the operations comprising:
acquiring information on a target region inside a glass window of a mobile object, and information on an external environment outside the mobile object, wherein the information on the external environment includes information on outside light incident on the glass window, and scenery information regarding scenery around the mobile object;
calculating, based on the acquired information on the target region and the acquired information on the external environment, a light shielding region for shielding the target region from light by blocking the outside light on the glass window; and,
setting a light shielding pattern of the light shielding region based on the scenery information.

19. A mobile object, comprising:
a glass window configured to divide at least a portion of an interior space from an outside of the mobile object;
an acquisition section configured to acquire information on a target region in the interior space, and information on an external environment outside the mobile object, wherein the information on the external environment includes information on outside light incident on the glass window, and scenery information regarding scenery around the mobile object;
a calculation section configured to:
calculate, based on the acquired information on the target region and the acquired information on the external environment, a light shielding region that blocks the outside light on the glass window to shield the target region; and
set a light shielding pattern of the light shielding region based on the scenery information; and
a light shielding unit on the glass window, wherein the light shielding unit is configured to generate the calculated light shielding region.

* * * * *